(12) United States Patent
Hyman

(10) Patent No.: US 8,675,243 B2
(45) Date of Patent: Mar. 18, 2014

(54) BLEED AREA ADJUSTMENT TECHNIQUE FOR USE IN PRINTING MULTIPLE ARTICLES OF MANUFACTURE

(75) Inventor: Jacob A. Hyman, Cambridge, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 597 days.

(21) Appl. No.: 12/371,807

(22) Filed: Feb. 16, 2009

(65) Prior Publication Data

US 2010/0207986 A1 Aug. 19, 2010

(51) Int. Cl.
*B41J 2/205* (2006.01)
*G06F 3/12* (2006.01)
*G06K 15/02* (2006.01)

(52) U.S. Cl.
USPC .............................. 358/1.2; 347/15; 358/1.15

(58) Field of Classification Search
USPC ........................................... 347/15; 358/1.15
See application file for complete search history.

(56) References Cited

U.S. PATENT DOCUMENTS

2006/0197963 A1 9/2006 Royal et al.
2008/0151322 A1* 6/2008 Morales et al. ............... 358/448
2008/0247800 A1 10/2008 Reichhart
2008/0266606 A1* 10/2008 Huenemann ................. 358/1.18

FOREIGN PATENT DOCUMENTS

EP 1840726 A 10/2007

* cited by examiner

*Primary Examiner* — David K Moore
*Assistant Examiner* — Justin Katzwhite
(74) *Attorney, Agent, or Firm* — Jessica Costa

(57) ABSTRACT

Techniques for creating an individual image sized to a desired print area plus a desired amount of bleed area to thereby reduce an amount of ink applied outside a desired print area are presented. In an embodiment, each of the desired print area dimensions, a default ink bleed width, and an ink bleed adjustment setting are obtained. The individual image comprises an image container sized to a desired print area plus a desired amount of bleed area. Each of the respective dimensions of the image container of the individual image is set to the corresponding respective dimension of the desired print area plus the default ink bleed width. A base image providing image content for the image container is sized to the dimensions of the image container if dimensions of the base image do not already equal the dimensions of the image container. If an adjustment to the bleed area is required, an adjustment setting indicative of a desired width of the ink bleed is obtained, and a white frame is inserted around the inside perimeter of the individual image, the white frame having a width equal to the difference between the default ink bleed width and the desired width of the ink bleed.

22 Claims, 20 Drawing Sheets

BLEED AREA ADJUSTMENT TECHNIQUE FOR USE IN PRINTING MULTIPLE ARTICLES OF MANUFACTURE

FIELD OF THE INVENTION

This invention relates to simultaneous printing of multiple images onto multiple articles of manufacture, and more particularly to a novel technique for combining individual images to be printed onto respective articles of manufacture into a single print file for simultaneous printing onto the multiple articles of manufacture by a printer.

BACKGROUND OF THE INVENTION

Various methods of direct printing of images or graphic designs onto textiles and various other non-paper substrates exist. In the industrial setting, an article on which an image is to be printed, for example an item of apparel such as a t-shirt, is typically loaded and secured onto a pallet such that the print surface of the article is secured in place. Typical industrial printers are designed for processing and printing only a single image file at a time. Consequently, prior art pallets have been designed for printing on a single substrate (e.g., a single sheet of paper, foam, fabric, etc.) at a time. Industrial printers, however, typically allow for a large print area. For example, an industrial printer may be configured to print an image of a square meter or more. However, oftentimes the article of manufacture to be printed on is much smaller than the print area that the printer is capable of printing, and thus much of the total print time is spent in loading the article onto the printer pallet and subsequently removing it from the pallet after the printing is complete. It would therefore be desirable to load multiple smaller articles onto a pallet and have the printer print respective desired images onto each of the loaded articles of manufacture during the printing of a single print file in order to reduce the total amount of time spent in loading and unloading the articles of manufacture from the printer pallet.

One difficulty in simultaneously printing multiple articles of manufacture that fit within the print area that the printer is capable of printing is the complexity involved in precisely positioning the articles of manufacture such that the respective image printed on each of the respective articles of manufacture is accurately aligned on the articles of manufacture in the precise position on the article of manufacture that the image is supposed to appear. Any misalignment of an article of manufacture on the printer pallet results in misplacement of the image on the article of manufacture, and can also result in the application of ink on areas of the article of manufacture and/or pallet where ink should not be. Residual ink on the pallet due to ink overspray from misalignment of the articles of manufacture can result in the transfer of ink or ink dust to subsequent items placed on the pallet.

Another reason that multiple items are typically not simultaneously printed is the complexity of instructing the printer exactly where to print each image on each article of manufacture on the pallet. As previously mentioned, printers generally print one image file at a time. Thus, to print multiple items simultaneously, each respective image to be printed onto each respective article of manufacture must be combined into one large combination image file, which can then be sent to the printer for simultaneous printing on the items loaded on the pallet. Building the combination image file, however, is not an easy task, as it involves both knowledge of the precise position of each article of manufacture on the pallet and the precise position of the printable area of each article of manufacture to be loaded onto the pallet, and knowledge of the mapping of pixels in the combination image file to the physical points on the pallet.

Yet a further complication in having the printer print multiple articles of manufacture at the same time is that even if the printer can be instructed, via the single image file that it receives, to print image content only on certain areas of the articles of manufacture on the pallet, the printing process generally results in at least some ink overspray (i.e., ink sprayed or splattered beyond the intended area of the printed image), which, depending on the placement of the image on the article of manufacture, can end up being applied to the pallet itself. When ink is deposited on the pallet, the ink can be transferred to subsequent sets of articles of manufacture loaded onto the pallet, either as wet ink or ink dust. This unintentionally transferred ink or ink dust can render flaws on subsequent articles of manufacture printed on the pallet.

Accordingly, it would be desirable to have available techniques for printing multiple articles of manufacture on a printer that prints one image at a time that also minimizes the aforementioned problems.

SUMMARY

Embodiments of the invention are directed at methods and systems for preparing a combination image file for a printer to accurately print multiple individual images contained in the combination image file onto multiple articles of manufacture while minimizing deposit of ink outside the desired print areas on the articles of manufacture.

In accordance with an embodiment of the invention, a method for creating an individual image sized to a desired print area plus a desired amount of bleed area includes obtaining dimensions of the desired print area, obtaining a default ink bleed width, obtaining an ink bleed adjustment setting, setting each of the respective dimensions of the individual image to the corresponding respective dimension of the desired print area plus the default ink bleed width, sizing the base image to the dimensions of the individual image if dimensions of a base image to be incorporated in the individual image do not equal the dimensions of the individual image, determining whether an adjustment is required to a bleed area defined by the default ink bleed width, and if an adjustment to the bleed area is required, obtaining an adjustment setting indicative of a desired width of the ink bleed and inserting a white frame around the inside perimeter of the individual image, the white frame having a width equal to the difference between a maximum default ink bleed and the desired width of the ink bleed.

In accordance with another embodiment of the invention, a method for creating the combination image file given a set of individual images sized to a desired print area plus a desired amount of bleed area, the method comprising: opening a combination image file template, the template having a plurality of slots, each of which corresponds to an area of a pallet assembly to be loaded onto a printer, and each area of the pallet assembly configured to be loaded with a single article of manufacture; identifying an unfilled slot; identifying an individual image for placement into the unfilled slot; filling the unfilled slot such that the unfilled slot becomes a filled slot by inserting the identified individual image in a predetermined position in the identified slot of the template; repeating the first identifying step through the repeating step until no more unfilled slots are identified, such that the opened template is a filled template; and saving the filled template as a combination image file.

It is an advantage of the invention that an ink bleed adjustment parameter allows adjustment of a default ink bleed width. This allows an operator or automatic process to monitor actual print characteristics and actual need for the full bleed area, and to adjust the width of the bleed area to reduce its width when the full bleed is not needed. This reduces the amount of ink utilized and therefore reduces the amount of printing costs. It also reduces the amount of ink applied to the carrier (and not to the actual articles of manufacture), thereby reducing the amount of cleanup required.

These and other objects, features and advantages of the invention will be better understood with reference to the accompanying drawings, description and claims.

DETAILED DESCRIPTION

It will be understood that while the discussion herein describes an embodiment of the invention in the field of preparation of customized printed mouse pads, the invention is not so limited and is relevant to preparation and simultaneous printing of multiple articles of manufacture, where the articles of manufacture may be any object capable of being printed on by a printer, and in particular a printer pallet supporting multiple separate articles of manufacture, which may include a removable tray and a positioner for assisting in the precise placement of articles onto the pallet.

Figure 1A:
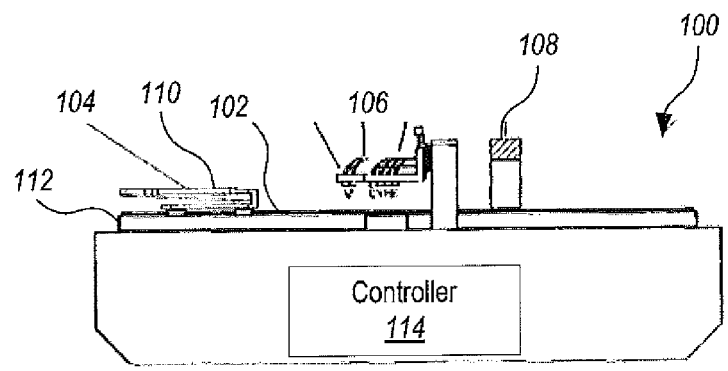
FIG. 1A is a side view of a digital image printer for printing digital images directly onto an article of manufacture.
Figure 1B:
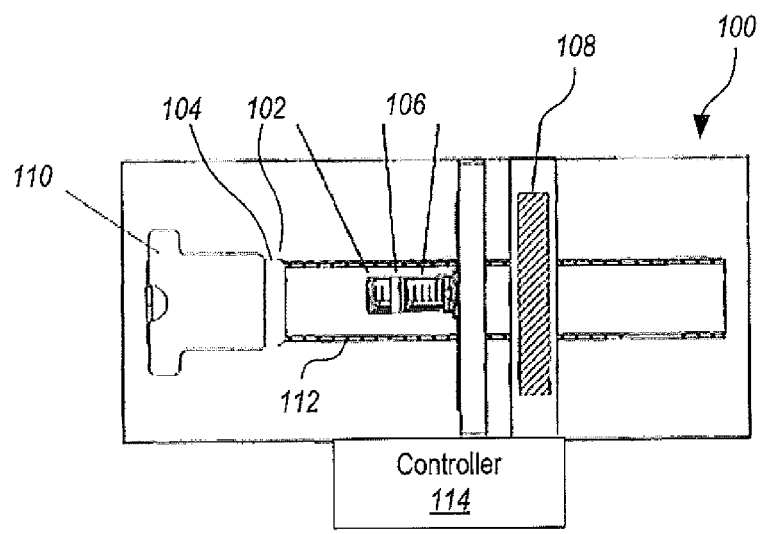
FIG. 1B is a top view of the digital image printer of FIG. 1A.

FIGS. 1A and 1B illustrate a digital image printer 100 for printing digital images directly onto an article of manufacture such as a mouse pad. The printer 100 includes a printing table 102 having a pallet 104 mounted thereon for holding an article of manufacture 110. The printer 100 also includes an array of inkjet print heads 106 and a drying unit 108. The printing table 102 is mounted on a conveyance system 112 which conveys the printing table 102 along a pre-determined path past the operative ends of the print heads 106 and the drying unit 108. The conveyance system 112 may be any automated or manual means for conveying the printing table 102 along the pre-determined path. For example, in one embodiment, the conveyance system 112 is an automated conveyor belt system under the control of a computer program. In another embodiment, the conveyance system 112 is a set of rollers over which the printing table slides when manually guided by a human operator.

A controller 114 is coupled to the printer 100 for causing printing of a digital image on the article of manufacture 110 on the pallet 104 as the printing table 102 passes the print heads 106. For a color image, the printing of the image is achieved by placing ink drops at different adjacent sites as discreet, physically non-mixed drops. The ink composition used must prevent the drops from "bleeding" on the applied media. In the illustrated embodiment, the image is printed by an array of color printing heads 114. The image is printed using subtractive primary colors: Cyan, Yellow, Magenta, and Black (CYMK), for example, using transparent ink. When printing on dark colored apparel, a layer of white ink may first be printed prior to printing the CYMK process. The printing may require a single pass of the article of manufacture 110 past the printheads 106, or series of passes, to complete the printing of the image on the article of manufacture 110. After the printing process is complete, the controller 114 may cause the printing table 102 to convey the article of manufacture 110 on the pallet 104 past a drying unit 108 to dry the ink on the article of manufacture 110.

Figure 1C:
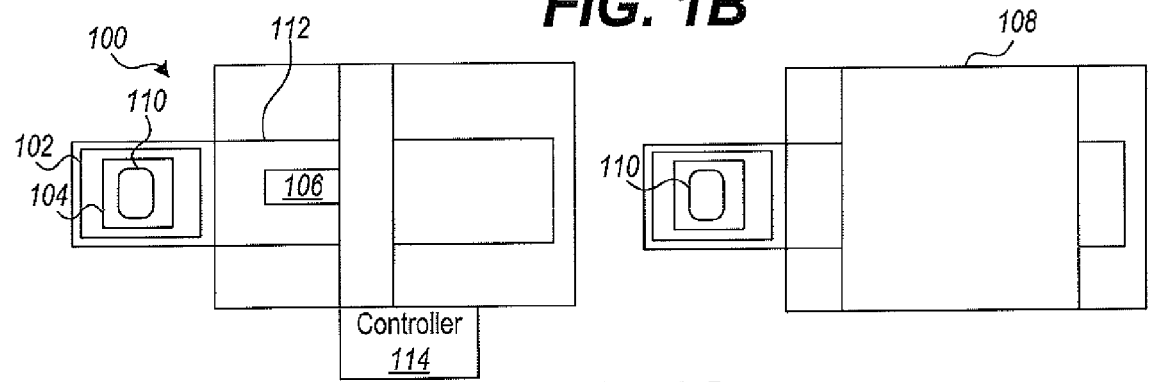
FIG. 1C is a top view of a digital image printer and separate drying unit.

FIGS. 1A and 1B show an embodiment of the printer 100 which includes the drying unit 108 and shares the same transport system 112 to pass the article of manufacture through the drying unit 108. Alternatively, as illustrated in FIG. 1C, the drying unit 108 may be an independent unit, requiring an operator (human or other means) to remove the printed article of manufacture 110 from the printer 100, transport the printed article of manufacture 110 to the independent drying unit 108, and to cause the printed article of manufacture 110 to be inserted into the drying unit 108 for drying.

Figure 2A:
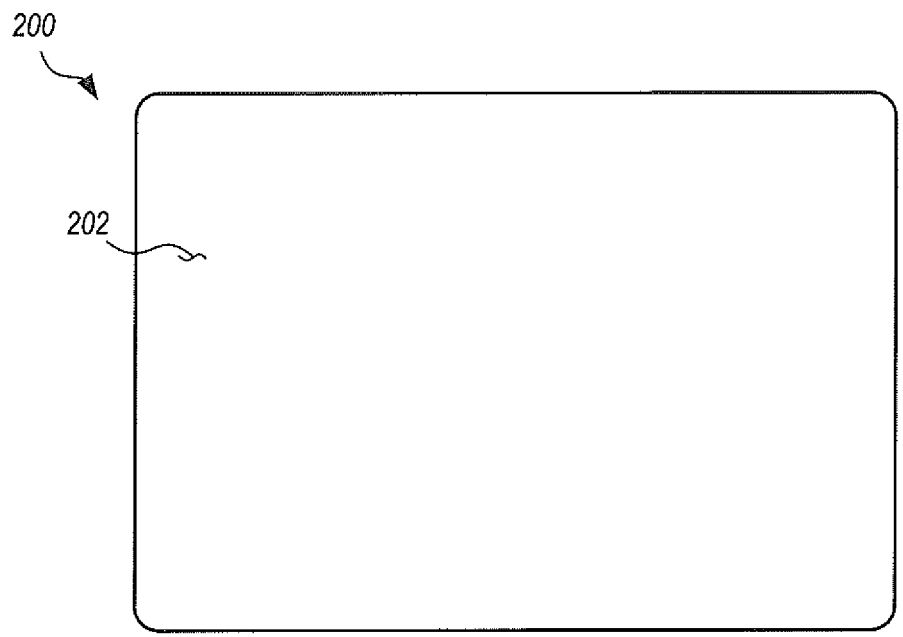
FIG. 2A is a top-down view of an exemplary embodiment of a mouse pad.
Figure 2B:
FIG. 2B is a side view of the mouse pad of FIG. 2A.

FIGS. 2A and 2B depict an exemplary mouse pad 200. As shown, the mouse pad 200 comprises a substrate 201 and a printable surface 202. In one embodiment, the shape of the mouse pad 200 is rectangular with rounded corners. However, it will be appreciated that the shape of the mouse pad can be any desired 2-dimensional shape and that the shape of the mouse pad is not limited to that illustrated. In an embodiment, the substrate 201 of the mouse pad is rubber and the printable surface is a cloth or other fabric that is adhered to the rubber substrate. In an embodiment, the dimensions of the mouse pad are 235 mm by 195 mm by 3 mm.

Figure 3A:
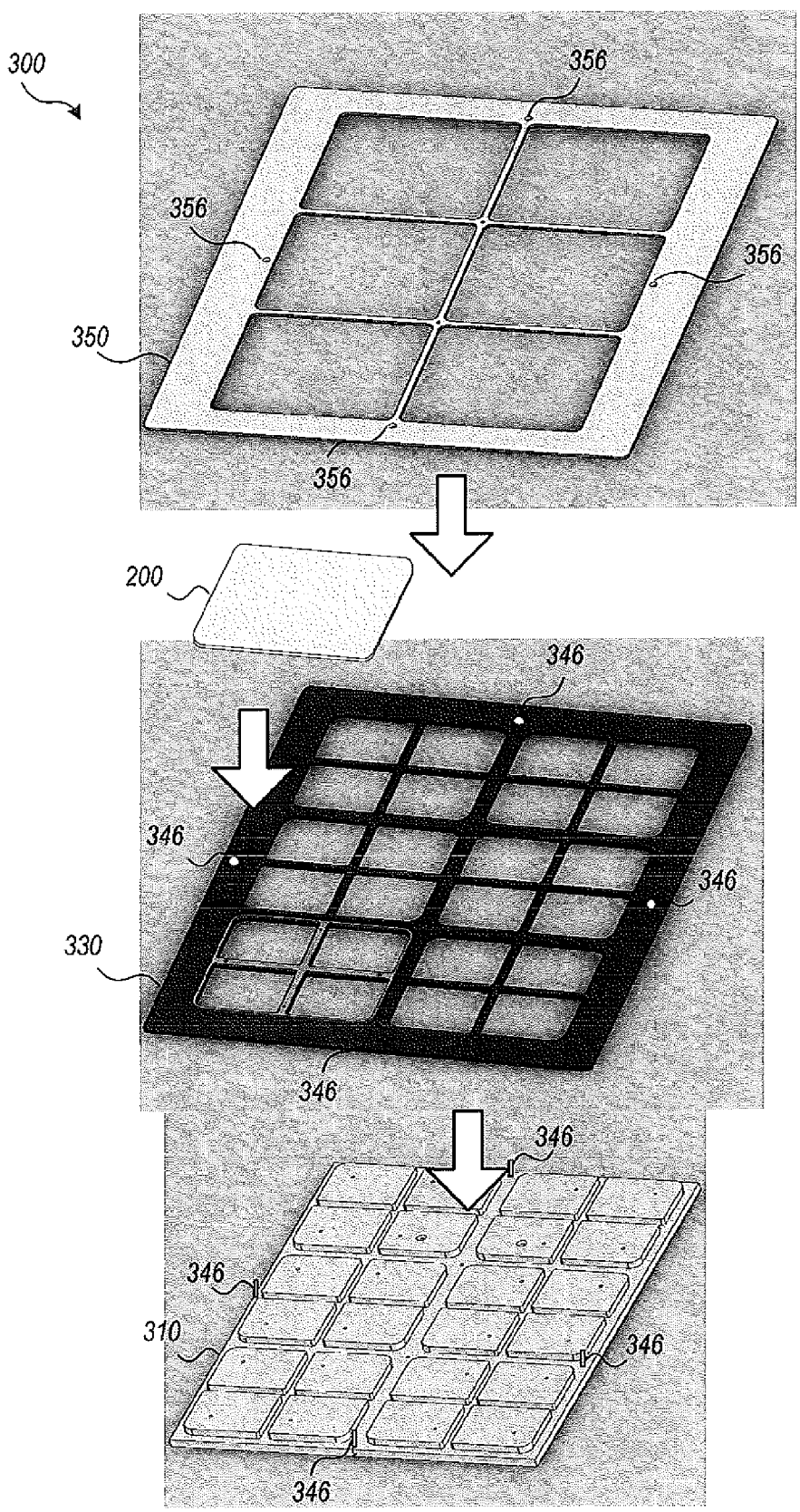
FIG. 3A is an exploded perspective view of an exemplary embodiment of a mouse pad pallet assembly.
Figure 3B:
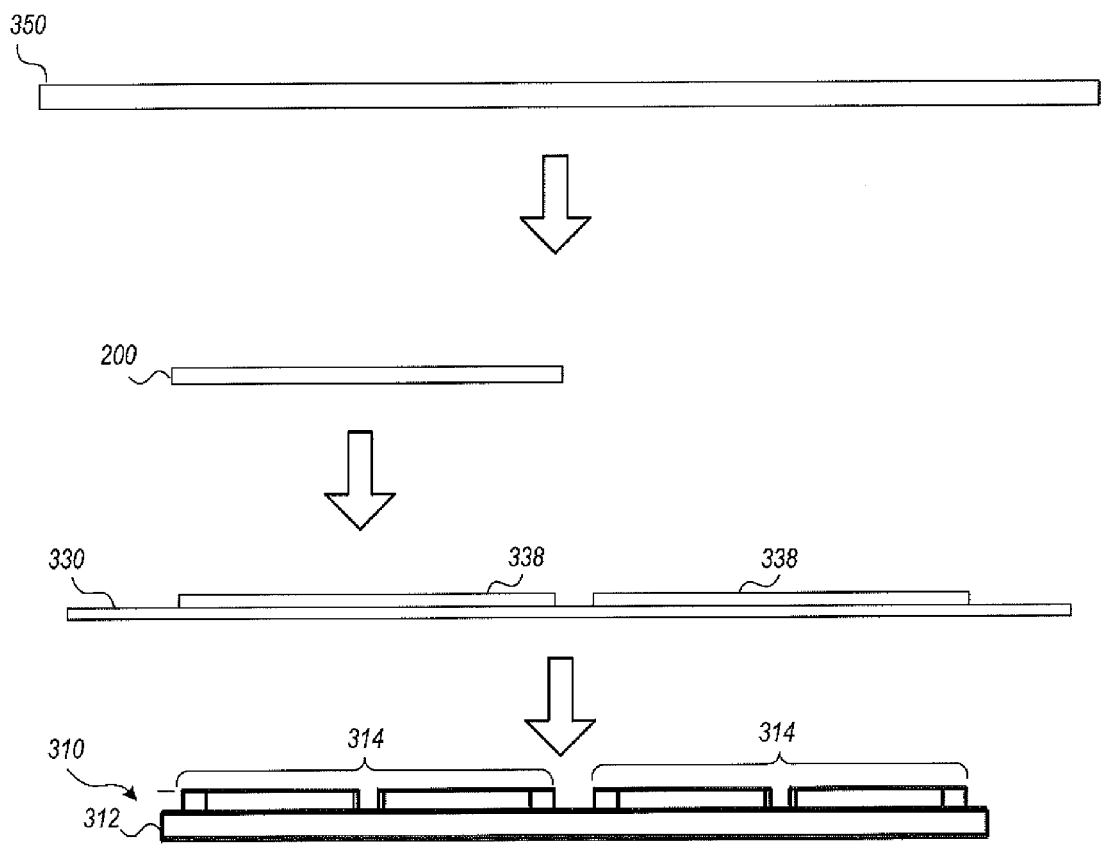
FIG. 3B is an exploded side view of the mouse pad pallet assembly of FIG. 3A.

FIGS. 3A-3B together illustrates an exemplary embodiment of a novel pallet assembly 300, including a pallet 310 for multiple articles of manufacture with carrier 330 and positioner 350. In the illustrative embodiment, the pallet assembly 300 is designed for articles of manufacture in the form of mouse pads 200, for example as shown in FIGS. 2A and 2B. The pallet 310 may be mounted on the printing table 102 in a printer 100 such as that shown in FIGS. 1A, 1B, and 1C and used to print respective images onto the printable surfaces 202 of the respective mouse pads 200.

Figure 4A:
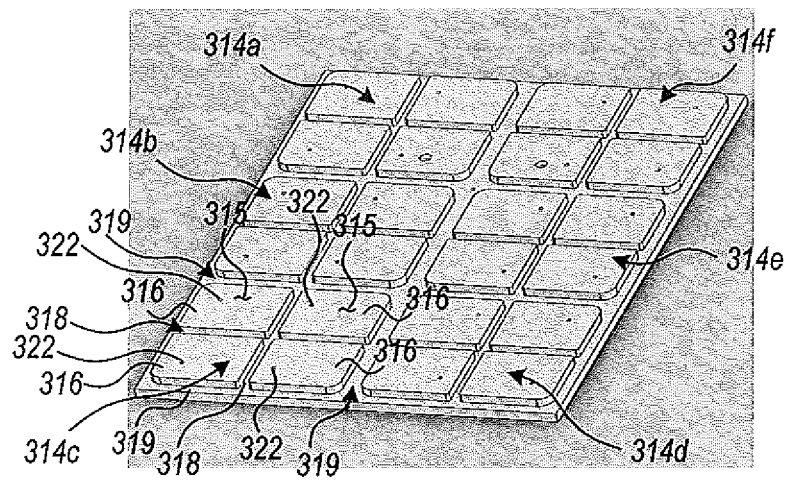
FIG. 4A is a perspective view of an exemplary embodiment of a mouse pad pallet.
Figure 4B:
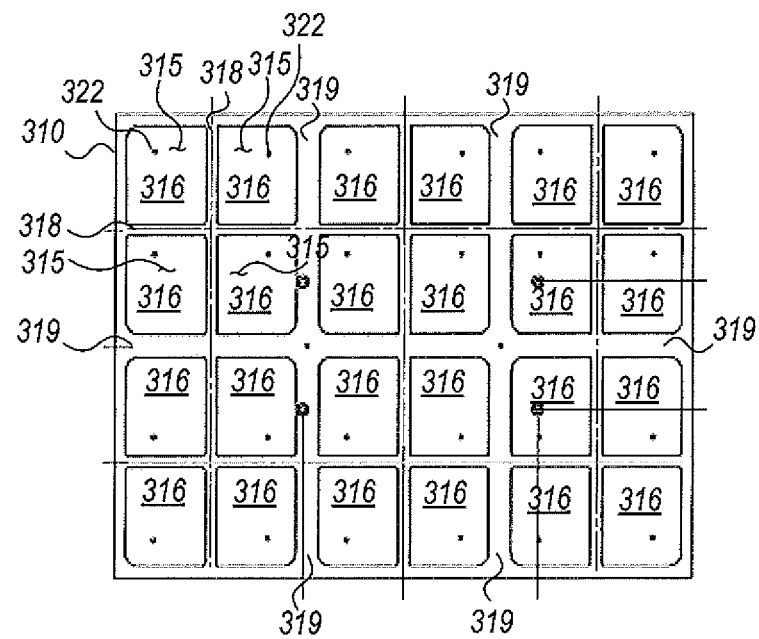
FIG. 4B is a top-down view of the mouse pad pallet of FIG. 4A.
Figure 4C:
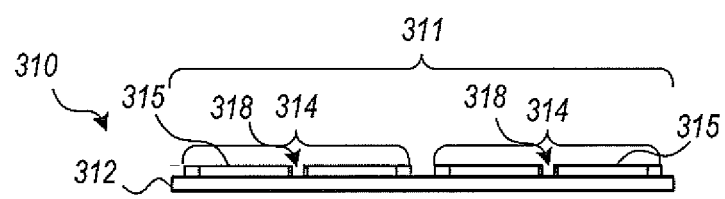
FIG. 4C is a side view of the mouse pad pallet of FIGS. 4A and 4B.

As illustrated in FIGS. 3A-3B, the pallet assembly 300 includes a pallet 310, a carrier tray 330, and a positioner 350. As best shown in FIGS. 4A-4C, the pallet 310 comprises a base 312 and has a top surface 311 which supports articles of manufacture to be printed. The base 312 of the pallet 310 is generally in the form of a large flat surface, such as a slab or plate. In an embodiment, the dimensions of the base 312 are, for example only and not limitation, 490 mm by 615 mm and 24 mm thick. In an embodiment, the pallet 310 is constructed of Aluminum or other metal, but may alternatively be fabricated using any hard and durable material such as, but not limited to, fiberglass, thermosetting plastic, etc.

In an embodiment, the top surface 311 of the pallet 310 may simply be one large smooth flat contiguous surface with no particular demarcations indicating where to place articles of manufacture.

In the illustrative embodiment, however, and for reasons that will become apparent hereinafter, the pallet 310 includes a plurality of platforms 314 (shown as 314a, 314b, 314c, 314d, 314e, 314f) protruding upward from the top surface 311 of the base 312 such that the horizontal surface (referred to herein as "top surface" 315) of the platforms are raised above the surface level of the pallet base 312. Each platform 314 supports one article of manufacture of a particular type. For example, in the illustrative embodiment, the article of manufacture is a mouse pad 200, and the pallet 310 includes six mouse pad platforms 314a, 314b, 314c, 314d, 314e, and 314f. (Of course, in other embodiments, there may be more or fewer such platforms, the number generally being determined based on the size of the printable area that the printer is capable of printing and the size of the articles of manufacture).

Each platform 314 has a top surface 315 that supports an article of manufacture (such as a mouse pad 200) placed thereon during the printing process to secure and expose the desired print area of the article of manufacture 200 in a consistent position and orientation. The pallet configuration requires articles of manufacture 200 to be placed in designated places and positions (as determined by the platforms), thereby fixing the positions of the articles of manufacture 200 on the pallet 330, and consequently fixing the positions of the print areas of the articles of manufacture 200 relative to the entire printable area that the printer 100 is capable of printing. This simplifies the image pixel mapping process in that each individual image to be printed on each corresponding article of manufacture 200 always maps to a predetermined set of points on the top surface 311 of the pallet 330.

In the illustrative embodiment, each platform 314 comprises four quadrants 316 separated by open channels 318. In an embodiment, the channels 318 criss-cross the platform 314 into four quadrants 316 of equal size. In an embodiment, the channels 318 are 12 mm wide. The depth of the channels 318 measured from the top surface 315 of the platform 314 is, for example only and not limitation, approximately 8 mm. The reason for the channels 318 passing through the platforms 314 is to allow portions of the carrier 330, called "support bars", as discussed subsequently, to rest within the channels 318 while still allowing the mouse pads 200 to sit flat upon the top surface 315 of the platforms 314.

Figure 5A:
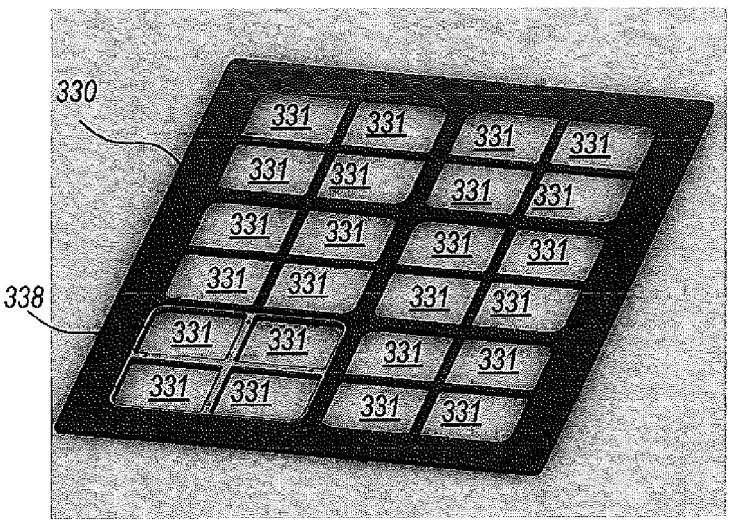
FIG. 5A is a perspective view of an exemplary embodiment of a mouse pad carrier configured to be used with the mouse pad pallet of FIGS. 4A-4C.
Figure 5B:
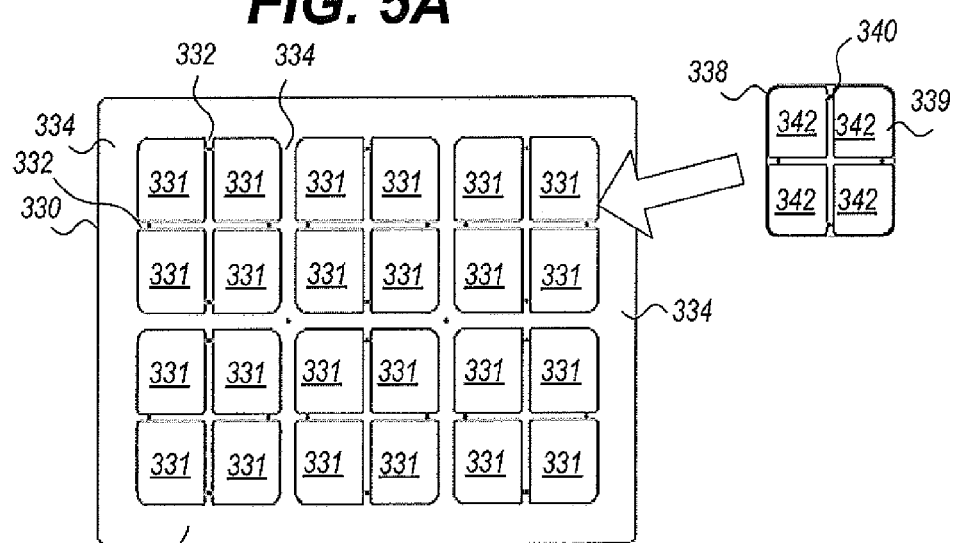
FIG. 5B is a top-down view of the mouse pad carrier of FIG. 5A.
Figure 5C:
FIG. 5C is a side view of the mouse pad carrier of FIGS. 5A and 5B.

FIGS. 5A-5C show an exemplary carrier 330 to be used with the pallet 310. The carrier 330 is generally a flat sheet of hard durable ink-resistant material having a plurality of apertures 331, each corresponding to a respective one of each of the platform sections 316 (i.e., platform quadrants). The shape and size of the each aperture 331 conforms substantially to the shape and size of the top surface 315 of its corresponding pallet platform section 316 such that when the carrier 330 is properly installed on the pallet 310, each of the platform sections 316 fits substantially conformingly within a corresponding respective aperture 331 of the carrier 330 yet otherwise substantially covers the entire top surface 311 of the pallet 310, thereby exposing only the top surfaces 315 of the pallet platforms 314 therethrough. Carrier sections 332 that correspond to platform channels 318 are referred to herein as support bars 332, as their function is to support the articles of manufacture 200 when the carrier 330 is removed from the pallet 310 such that the articles of manufacture 200 do not fall out of the carrier 330 during transport. Carrier sections 334 that fit around the perimeters of the platforms 314 as a whole are referred to herein as frame sections 334. The shapes of the apertures 331 substantially conform to corresponding shapes of the platform sections 316 of the pallet 310 such that when the carrier 330 is installed over the pallet 310, the support bars 332 lie within the platform channels 318 and the carrier frame sections 334 lie within the channels 319 formed between and around the platforms 314 of the pallet 310.

In an embodiment, the carrier dimensions are at least 570 mm by 695 mm by 4 mm thick. Thus, the dimensions of the surface of the carrier 330 that lies parallel to the plane of the print surface of the pallet are larger than the dimensions of the top surface 311 of the pallet 310. In an embodiment, the width of the support bars 332 which fit into the platform channels 318 is 10 mm, and the width of the frame sections 334 which fit between the individual platforms, or pallet channels 319, of the pallet 310 is 20 mm. Noticeably, the width of the support bars 332 which fit into the platform channels 318 is only slightly smaller (e.g., 2 mm) than the width of the platform channels 318, and the width of the frame sections 334 which fit into the pallet channels 319 between the individual platforms 314 of the pallet 310 is only slightly smaller (e.g., 4 mm) than the width of the corresponding channels 319 between the individual platforms 314 of the pallet 310. The dimensions of the apertures 331, support bars 332, and frame sections 334 and the outside dimensions of the carrier 330 are all designed to allow the carrier 330 to be easily installed over the pallet to expose the top surfaces 315 of the platform sections 316 while still ensuring that substantially all of the remaining surface area of the pallet 310 which form the channels 318 and 319 is covered by the carrier 330 to prevent ink from accumulating in the any of the channels of the pallet 310. That is, when the carrier 310 is installed properly over the pallet 310, only the top surfaces of the pallet platforms are exposed therethrough. Since all of the exposed top surfaces 315 of the platforms 314 will be covered by articles of manufacture during printing, and the carrier 330 otherwise covers the remaining top surfaces of the pallet 310, no ink (or at least very little ink) can accumulate on the pallet 310 itself. In an embodiment, the carrier 330 is constructed of a hard durable plastic that is resistant to the type of ink to be applied to the articles of manufacture, making the carrier 330 easily washable or otherwise cleanable, such as, but not limited to, Polyamide and Polyester resin on a fiberglass matt, but may alternatively be fabricated using any hard durable easily-cleanable material such as thermosetting plastic.

Figure 7A:
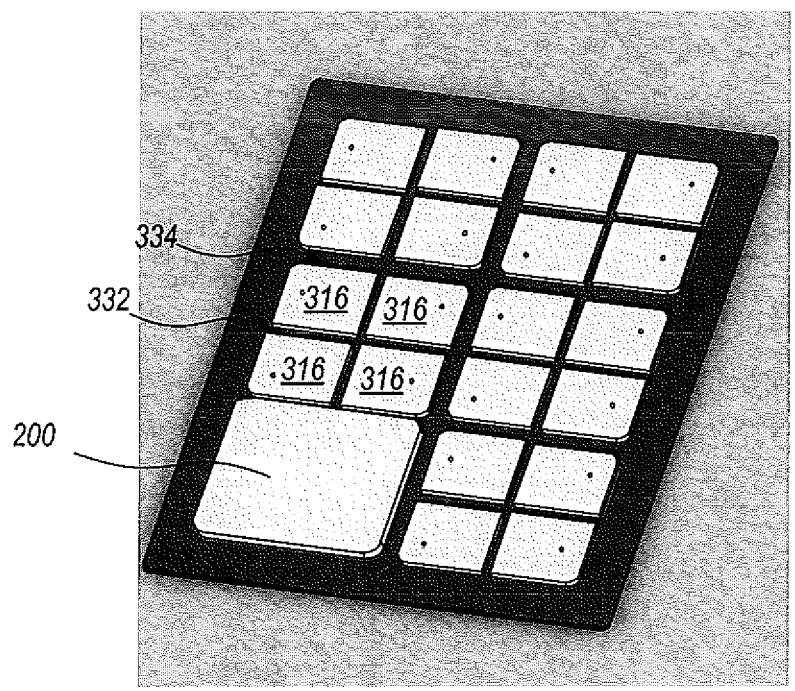
FIG. 7A is a perspective view of a pallet assembly wherein the carrier is mounted on the pallet.
Figure 7B:
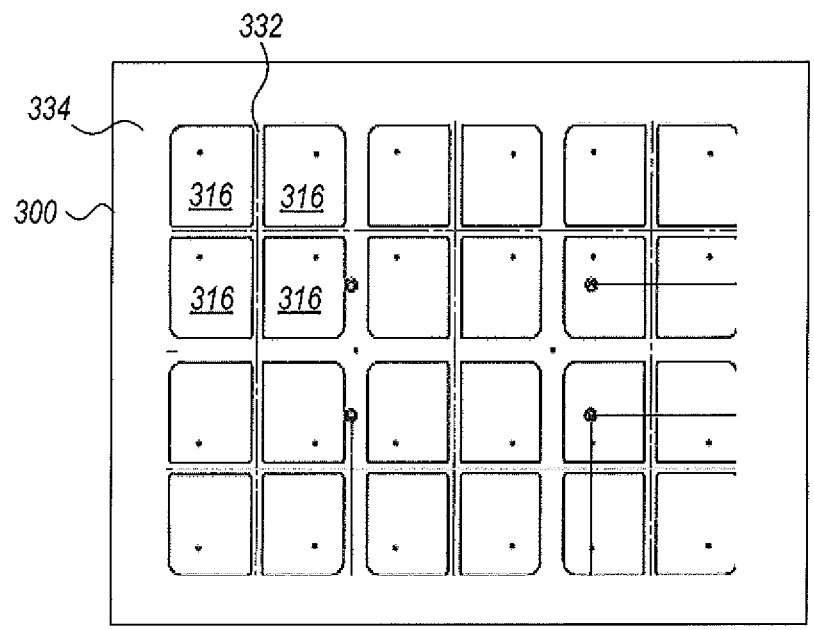
FIG. 7B is a top-down view of the pallet assembly of FIG. 7A.
Figure 7C:
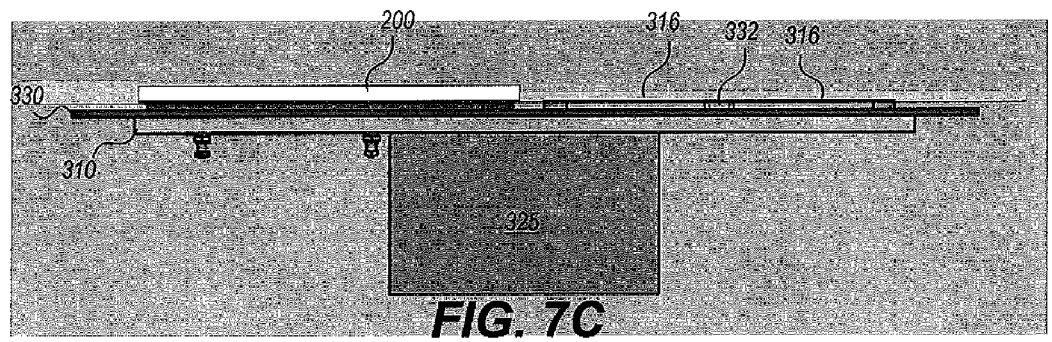
FIG. 7C is a side view of the of the pallet assembly of FIGS. 7A and 7B.
Figure 8C:
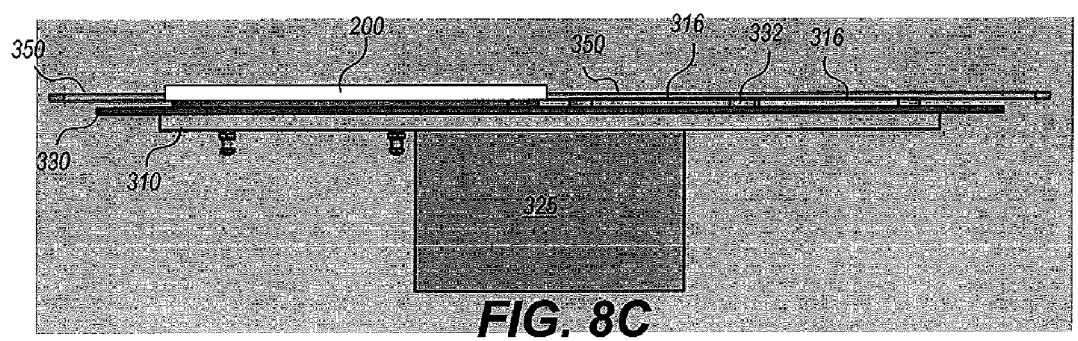
FIG. 8C is a side view of the of the pallet assembly of FIGS. 8A and 8B.

In one embodiment, the carrier 330 may be formed as a single flat sheet of material, or base 335, with the apertures 331 positioned to accommodate the platform quadrants 316 as previously described. However, if the thickness of the carrier 330 is less than the depth of the support channels 318, it is possible that the mouse pad 200 will not lie completely flat in the areas of the support channels 318 due to lack of direct support underneath the mouse pad 200 in these areas. Accordingly, in one embodiment, the support bars 332 of the carrier 330 are configured to protrude above the plane of the base 335 of the carrier 330. That is, the top horizontal surface of the support bars 332 are raised above the surface level of the carrier base 335. The height of the top surface of the support bars 332 above the top surface of the base 335 of the carrier 330 is preferably equal to the difference between the depth of the support channels 318 and the thickness of the carrier base 335. This ensures that when the carrier 330 is installed over the pallet 310 such that the top surfaces 315 of the platform quadrants 316 are exposed through the apertures 331 of the carrier 330, the top surfaces of the support bars 332 of the carrier 330 lie flush with the top surface 315 of the platforms 314 of the pallet 310. This is best illustrated in FIG. 7C, which shows a side cross-sectional view of a carrier 330 with reinforced support bars 335 protruding above the plane of the top surface of the carrier base 335. The perspective view and top-down views are shown in FIGS. 7A and 7B for reference. Thus, when a mouse pad 200 is placed on the platform 314, the mouse pad 200 is completely supported at all points thereunder, either by the pallet platform quadrants 316 or the carrier support bars 332.

In one embodiment, the carrier 330 is implemented with a flat base 335 having apertures 331 corresponding to each of the platform quadrants 316. For each set of support bars 332 corresponding to one of the platforms 314 of the pallet 310, a support plate 338 is attached, as best illustrated in FIG. 5B. Each support plate 338 comprises a frame 339 and matching criss-crossed support bars 340 to form four apertures 342 substantially the size and shape of the four respective platform quadrants 316. The thickness of the support plate 338 is preferably the difference between the depth of the support channels 318 on the pallet and the thickness of the carrier base 335.

Once the carrier 330 is installed over the pallet, for example as shown in FIGS. 7A-7C, the articles of manufacture 200 may be placed onto each platform 314 using visual alignment. For example, in an embodiment, the outer dimensions of the platforms 314 may be configured to exactly match the outer dimensions of the mouse pad 200 that will be supported thereon. In this case, a print operator may place a mouse pad 200 on each platform 314 and visually align each mouse pad 200 directly over its respective platform 314 so that there is no overhang in any direction.

Figure 6A:
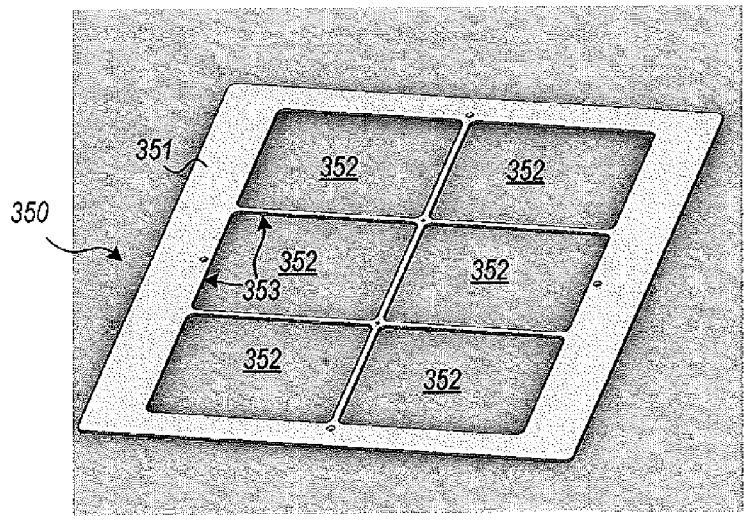
FIG. 6A is a perspective view of an exemplary embodiment of a mouse pad positioner configured to be used with the mouse pad pallet of FIGS. 4A-4C and carrier of FIGS. 5A-5C.
Figure 6B:
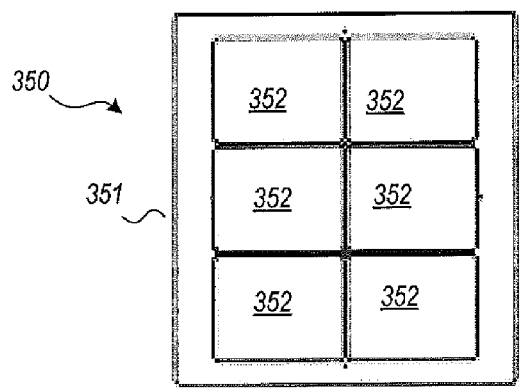
FIG. 6B is a top-down view of the mouse pad positioner of FIG. 6A.
Figure 6C:
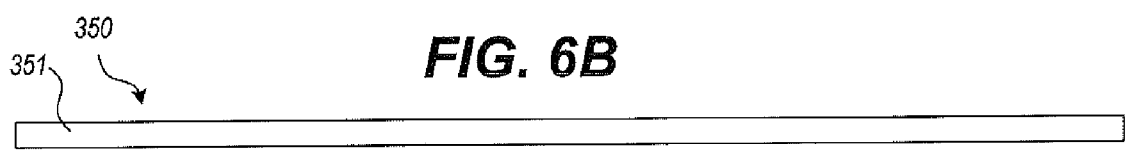
FIG. 6C is a side view of the mouse pad positioner of FIGS. 6A and 6B.

Alternatively, the pallet assembly 300 may include a positioner 350, shown best in FIGS. 3A, 3B, and 8A-8C, which is placed over the carrier 330 on the pallet 310 and used to quickly position articles of manufacture 200 in precise alignment on respective platforms 314 of the pallet 310. FIGS. 6A-6C illustrate an exemplary positioner 350 to be used with the pallet 310 and carrier 330. The positioner 350 is generally a flat sheet of hard durable material such as Aluminum or plastic having apertures 352 corresponding to each platform 314 on the pallet 310 and having dimensions that substantially conform to the outer perimeter of the particular type of article of manufacture 200 to be placed on each platform. In the illustrative embodiment where the articles of manufacture are mouse pads 200, the dimensions of each of the apertures 352 of the positioner 350 are substantially the dimensions of the mouse pads 200 to be positioned therein, plus a small amount of wiggle room (e.g., a few or less mm) to allow the mouse pads 200 to be easily placed within the aperture 352 in its correct orientation and then to allow the positioner 350 to be pulled up and removed while allowing the mouse pads 200 to remain in place on the platforms 314 without being disturbed by the removal of the positioner 350. In an embodiment, the pallet 310 includes holes 322 which connect to a vacuum system (not shown) which is activated to secure the articles of manufacture 200 in place once they are aligned and to prevent any further movement of the articles of manufacture 200 during the printing process.

In an embodiment, the dimensions of the positioner 350 are 620 mm by 750 mm by 4 mm thick, slightly larger than those of the carrier 330 to allow the positioner 350 to be handled at its outside edges without touching the carrier 330. The added surface area can therefore operate as inherent handles for removing the positioner 350 from the carrier 330 without unintentionally pulling the carrier off the pallet 310 along with the positioner 350. In an embodiment, the dimensions of each of the positioner apertures is 242 mm by 198 mm, only 5 mm greater along each dimension than the corresponding dimensions of the mouse pads 200 to be seated therein. The positions of the apertures 352 and the outside dimensions of the positioner 350 are all designed to allow the positioner 350 to be easily installed in place over the pallet 310 and carrier 330 such that only the platform surfaces 315 of the pallet 310 are exposed therethrough, and easily removed from the carrier 330 without disturbing either the mouse pads 200 resting on the platforms 314 or the carrier 330. In an embodiment, the positioner 350 is constructed of a hard durable material, such as Aluminum or another metal or plastic material.

In operation, the pallet 310 is mounted on the printing table 102 or other such printer transport mechanism. Generally, the pallet 310 will be fixedly mounted to the printing table 102, either directly or via an intervening pallet base 325, using bolts or other attachment means so that the pallet 310 cannot move relative to the transport mechanism 102. When a batch of articles of manufacture 200 is to be printed, the carrier 330 is mounted onto the pallet 310 in a position such that the platforms 314 are exposed through the apertures 331 of the carrier 330. The positioner 350 is then mounted onto the carrier 330, again such that the platforms 314 are exposed through the apertures 331, 352 of both the carrier 330 and the positioner 350, respectively. An operator then places articles of manufacture 200 onto each of the exposed platforms 314 using the edges 353 of the apertures 352 of the positioner 350 as an alignment guide. In an embodiment, the combined thicknesses of the carrier 330 and positioner 350 is greater than the depth of the frame section channels 319 such that top surface of the positioner 350 lies on a plane above the plane of the top surface 315 of the platforms 314. This allows the operator to utilize the edges 353 of the positioner apertures 352 as a physical guide (like a jig) when placing the mouse pads 200 on the platforms 314 and within the positioner apertures 352. To be properly placed, the mouse pad 200 must be placed, with its printable surface 202 0facing up, such that it fits entirely within an aperture 352 of the positioner 350. Thus, to ensure accurate placement, the size and shape of the apertures 352 in the positioner 350 should closely match the size and shape of the articles of manufacture 200 to be positioned therewith. Placement of the mouse pads 200 on the pallet platforms 314 within the positioner apertures 352 is therefore similar to placement of a wooden or foam puzzle piece into a puzzle base.

Handles (not shown) may be affixed to the carrier 330 and/or the positioner 350 to facilitate placement of the carrier 330 and positioner 310 onto the pallet 310 and subsequent removal of the positioner 350 and carrier 330 therefrom. Alternatively, handles may be fabricated integral to the carrier 330 and/or the positioner 350, for example by creating one or more additional apertures along one or more edges of the carrier 330 and/or positioner 350 which may serve as handles.

In order to facilitate and further ensure accurate placement of the carrier 330 and/or the positioner 350 onto the pallet 310, the pallet 310 may include one or more alignment pins 326 protruding perpendicularly from the top surface 311 of the pallet 310. Such alignment pins 326 should be placed along the frame sections 319 so as not to interfere with the print surface 315 of the platforms 314. When alignment pins 326 are used, the carrier 330 and/or the positioner 350 should include matching apertures 346, 356 on the carrier 330 and positioner 350, respectively, through which the pin(s) 326 are inserted when the carrier 330 and/or the positioner 350 are lowered into position over the pallet 310. Such alignment techniques are well-known in the art.

While the preferred embodiment of the pallet assembly includes the removable positioner 350, in an alternative embodiment, alignment of the mouse pads on the pallet platforms 314 is accomplished using one or more visual alignment indicators. For example, in one embodiment, the carrier could include an inscribed line or set of lines indicating where the edges of the mouse pad should align on the carrier 330. One disadvantage of this embodiment is that the visual indicator(s) may become obscured should there be any ink overspray onto the alignment indicators.

Figure 9C:
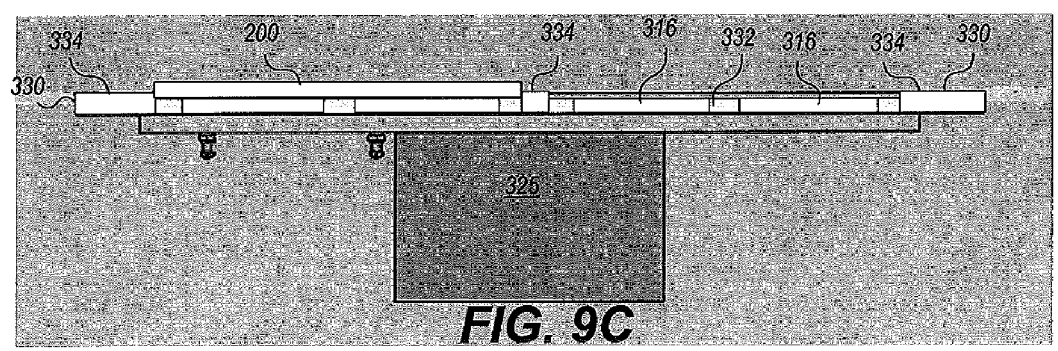
FIG. 9C is a side view of the of the pallet assembly of FIGS. 9A and 9B.
Figure 8A:
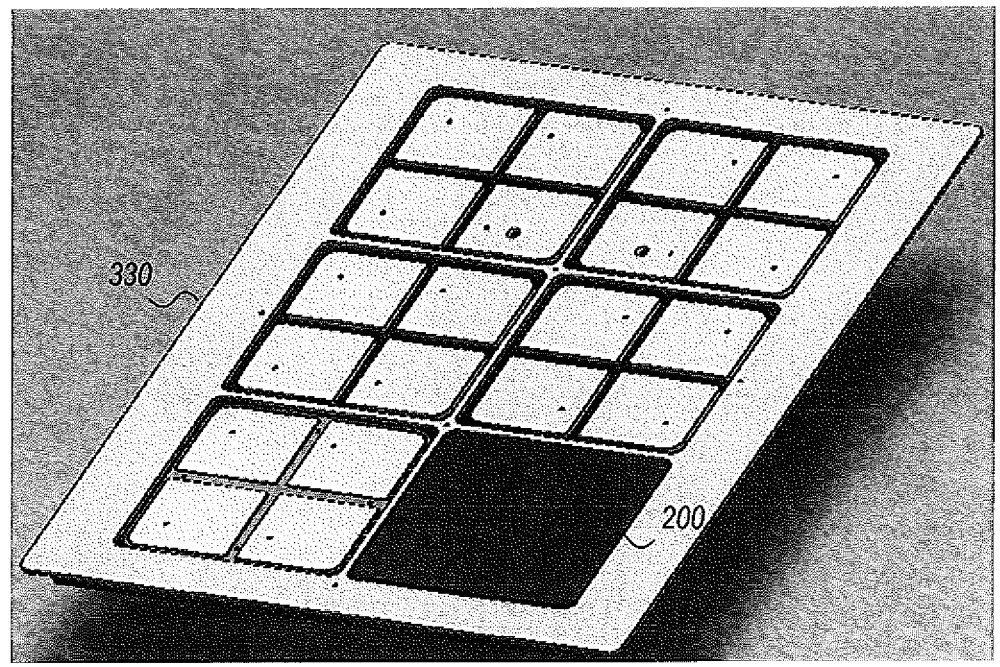
FIG. 8A is a perspective view of a pallet assembly wherein the carrier is mounted on the pallet and the positioner is mounted over the carrier.
Figure 8B:
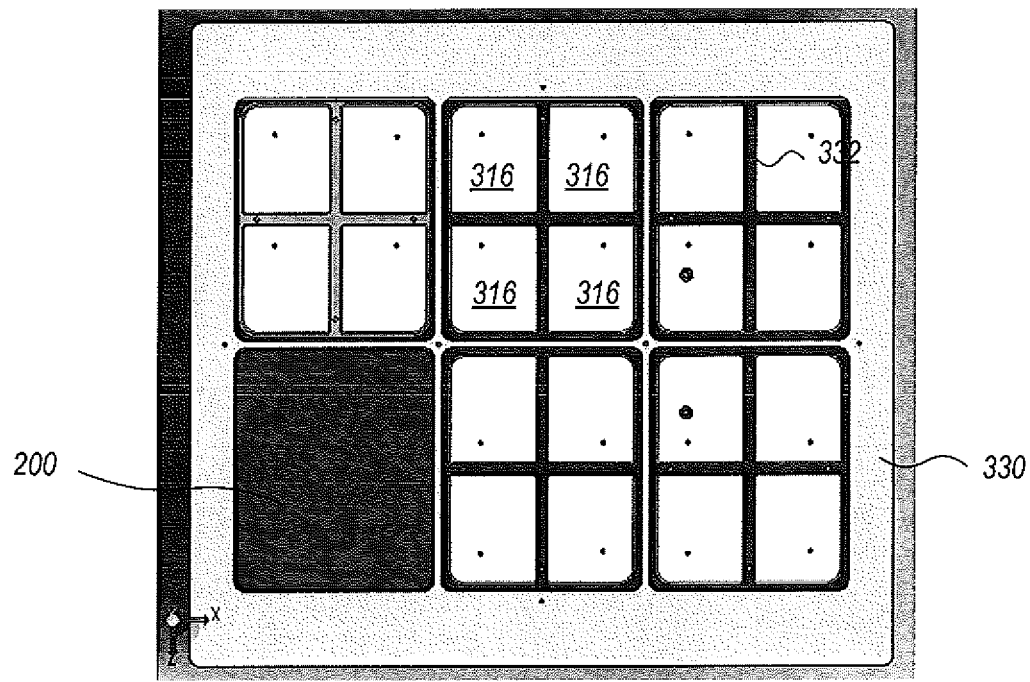
FIG. 8B is a top-down view of the pallet assembly of FIG. 8A.
Figure 9A:
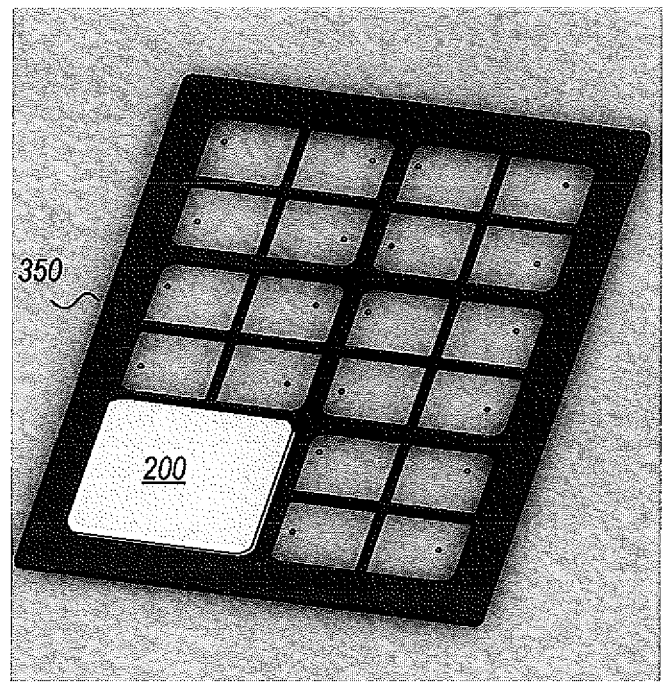
FIG. 9A is a perspective view of a pallet assembly wherein a carrier which also operates as a positioner is mounted on the pallet.
Figure 9B:
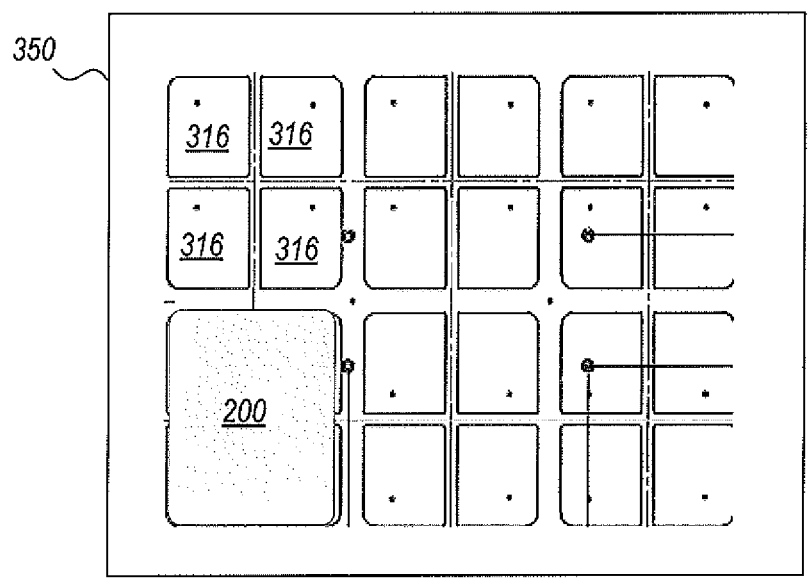
FIG. 9B is a top-down view of the pallet assembly of FIG. 9A.
Figure 10:
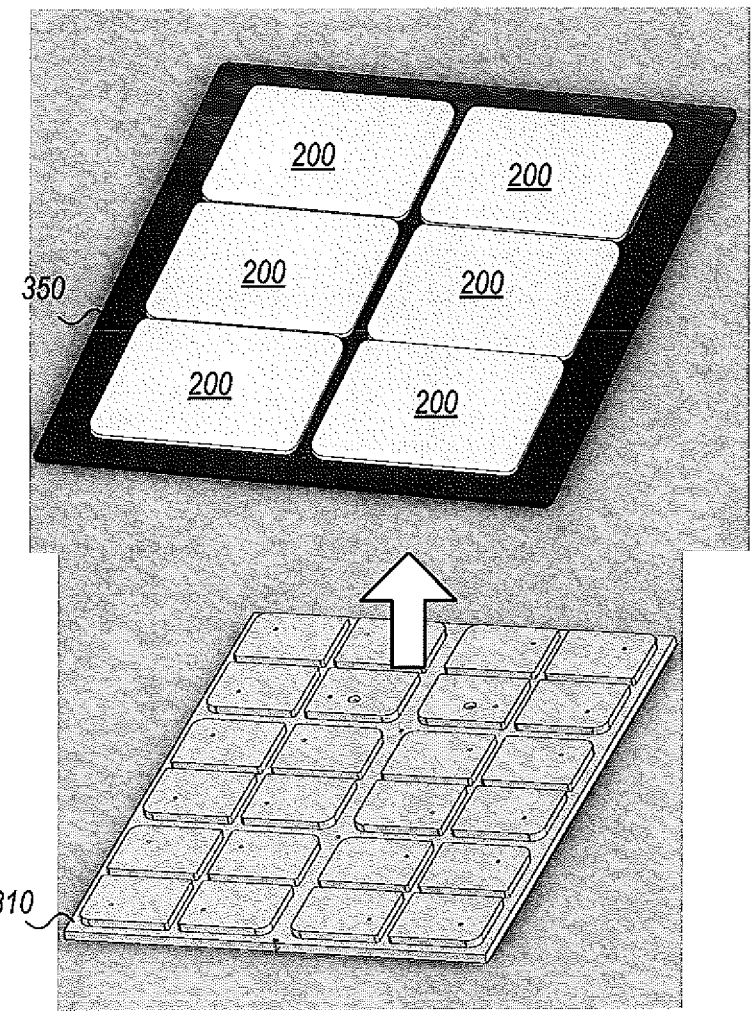
FIG. 10 is a perspective view of a carrier loaded with mouse pads being removed from the pallet.

In an alternative embodiment, the carrier 330 itself can also operate as a positioner. As best shown in FIGS. 9A-9C, the thickness of the carrier base 335 may be configured to be greater than the depth of the support channels 318 such that the edges of the carrier apertures 331 extend above the top surface 315 of the platforms 314, allowing the operator to utilize the aperture edges as a jig in placing the mouse pads 200 on the platforms 314.

In another alternative embodiment, platforms may be configured with physical alignment assists, such as corner guides mounted at each corner of each platform. In this embodiment, the operator need only ensure that each of the four corners of the mouse pad align within a respective corner guide on the platform. However, the corner guides are likewise subject to ink overspray, which may soil subsequent mouse pads that are mounted on the same pallet platform. Even when the ink dries between each use of the pallet, dry ink is subject to turning into ink dust, which then smudges subsequently mounted mouse pads. Yet other alignment mechanisms or indicators may be also be implemented.

Variations of the illustrated pallet assembly 300 may be implemented without departing from the scope of the claimed invention. For example, the shapes of the mouse pads may not be rectangular but rather some other shape. The shape of the pallet platforms may be configured to match the shape of the articles of manufacture to be printed. Likewise the shapes of the apertures in the carrier and positioner can be similarly shaped to match that of the articles of manufacture to be printed. Furthermore, the articles of manufacture to be printed may not be mouse pads at all, but rather some other article of manufacture. Additionally, the material from which each of the pallet, carrier, and positioner is made may vary from that described in the illustrative embodiments.

The pallet assembly 300 described herein ensures accurate positioning and alignment of articles of manufacture on a printer pallet. The pallet assembly is important among other reasons, because it ensures that the desired print area for the image to be printed on each article of manufacture is guaranteed to be within a respective predetermined area on the pallet allowing for a predetermined amount of tolerance. This is important because the combination image file that incorporates each of the individual images to be printed on the respective articles of manufacture loaded on the pallet must be designed such that each respective individual image is placed in the combination image file such that when the combination image file is printed, each individual image is printed on the desired print area of a respective article of manufacture on the pallet.

Figure 11:
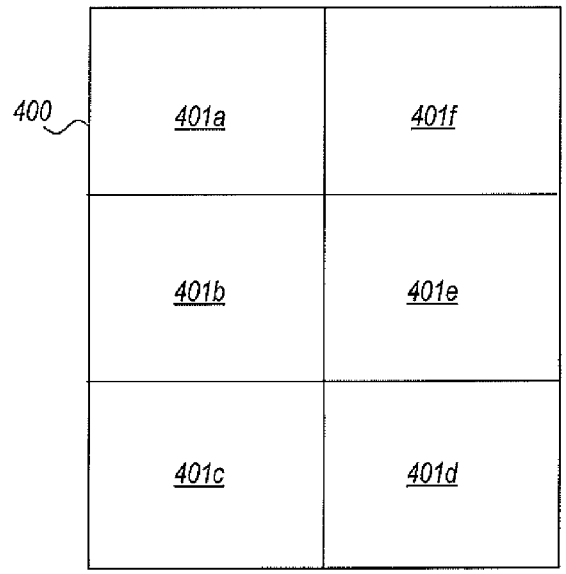
FIG. 11 is a combination image file template for use in simultaneously printing multiple articles of manufacture loaded onto the pallet assembly of FIGS. 3A-3B.

FIG. 11 illustrates an example combination image file template 400 having one slot 401a, 401b, 401c, 401d, 401e, 401f (generally referred as 401) corresponding to each platform 314a, 314b, 314c, 314d, 314e, 314f on the pallet 310. Each respective slot 401a, 401b, 401c, 401d, 401e, 401f is configured to receive image content to be printed only on an article of manufacture mounted on its corresponding platform 314a, 314b, 314c, 314d, 314e, 314f. Image content (referred to herein as an "individual image") to be printed on a given article of manufacture is inserted into the respective slot 401 of the combination image file template 400 that corresponds to the particular pallet platform 314 on which the article of manufacture is to be loaded.

Figure 12:
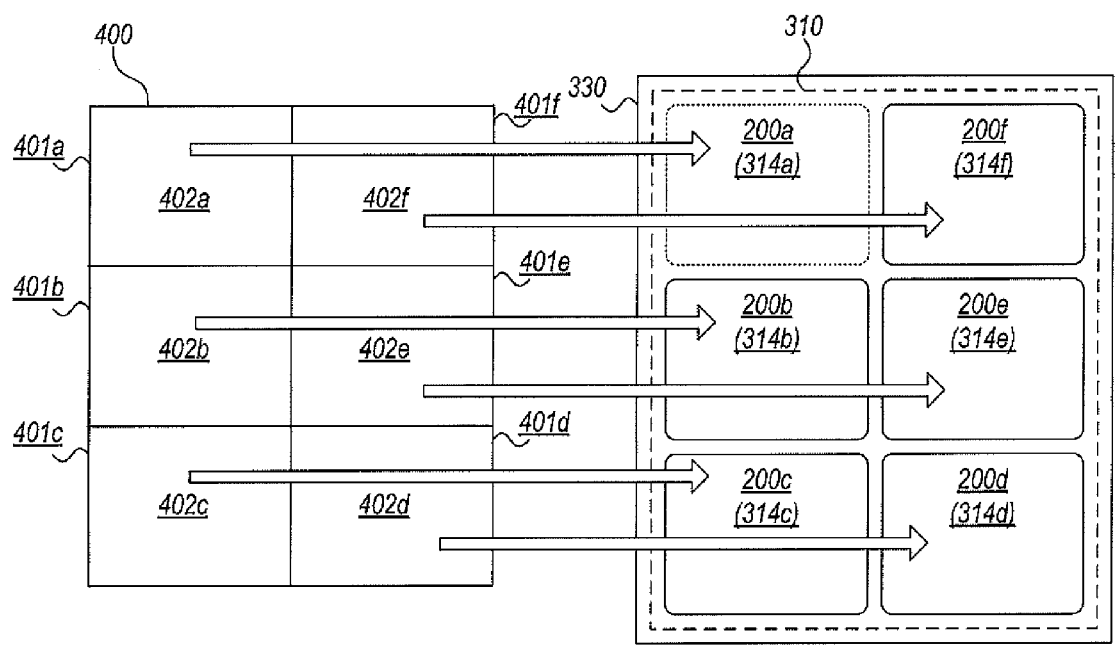
FIG. 12 is a diagram illustrating the correspondence between slots in the combination image file template and areas of a loaded pallet assembly.

Thus, as illustrated in FIG. 12, individual image 402a is inserted into slot 401a corresponding to the particular platform 314a on which a mouse pad 200a is to be loaded. The individual image 402a will therefore be printed only on the mouse pad 200a loaded on platform 314a, and not on the other mouse pads. Similarly, individual image 402b is inserted into slot 401b corresponding to the particular platform 314b that another mouse pad 200b is to be loaded. The individual image 402b will be printed only on the mouse pad 200b loaded on platform 314b and not the other mouse pads on the pallet 310. Similarly respective individual images 402c, 402d, 402e, 402f inserted in respective slots 401c, 401d, 401e, 401f will be printed only on the mouse pads 200c, 200d, 200e, 200f loaded on respective platforms 314c, 314d, 314e, 314f.

In the case, as with mouse pads 200, that the pallet 310 and carrier 350 is designed such that the articles of manufacture do not actually touch each other when loaded on the pallet assembly 300, in an embodiment the individual images 402a, 402b, 402c, 402d, 402e, 402f inserted into each of the corresponding slots 401a, 401b, 401c, 401d, 401e, 401f of the combination image file template 400 are sized so as not to completely fill its corresponding slot, leaving white or transparent pixels in the portion of the slot not covered by the individual image. Since the printer does not print transparent pixels (and/or may be configured not to print white areas of the image), no ink will be applied to the loaded pallet assembly in the areas not containing image content, or in areas of the articles of manufacture that are not intended to be covered by image content. This is desirable so as to prevent ink from being applied on areas of the articles of manufacture that should not have image content, and also, in the case where the image content is to completely cover the exposed surface of the articles of manufacture, to reduce the amount of ink applied to the carrier 330 rather than the articles of manufacture. For example, in the case of mouse pads 200 where each individual image is to cover the entire top surface 202 of the mouse pad, it is desirable to have white or transparent pixels which correspond to the frame sections of the carrier 330 so as to reduce the amount of ink applied to the carrier. Accordingly, in an embodiment the individual images 402a, 402b, 402c, 402d, 402e, 402f may be sized smaller than the slots 401a, 401b, 401c, 401d, 401e, 401f and centered within the slot when inserted into a slot. (As described below, the individual images 402a, 402b, 402c, 402d, 402e, 402f may include a bleed area which may result in the individual images completely filling the corresponding slots 401a, 401b, 401c, 401d, 401e, 401f).

Figure 13:
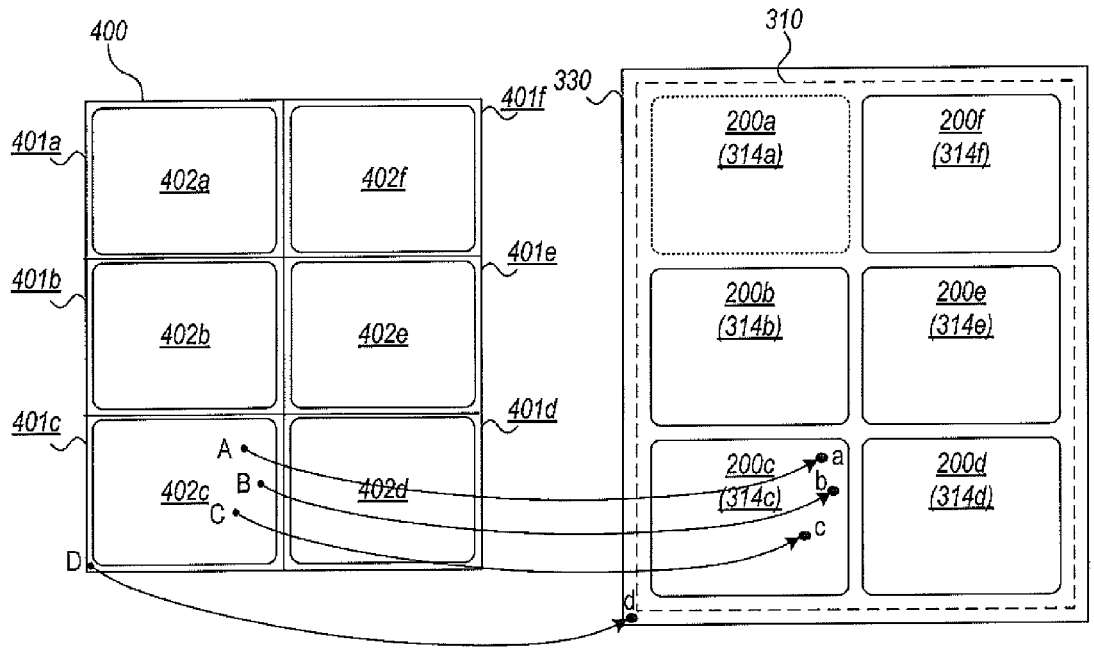
FIG. 13 is a diagram illustrating the mapping of pixels in the combination image file template to points on a loaded pallet assembly.

As further explanation, each pixel in the combination image file template 400 (and also each pixel in the resulting combination image file 500 (see FIG. 17) generated by inserting individual images 402a, 402b, 402c, 402d, 402e, 402f into each of the individual slots 401a, 401b, 401c, 401d, 401e, 401f of the template 400) must map to a point on the pallet assembly 300. Thus, the pixels in each individual image 402a, 402b, 402c, 402d, 402e, 402f in the combination image file 400 must map to corresponding points on the pallet 310, and preferably to points which coincide with a desired print area on an article of manufacture 200 loaded on the pallet 310 above the corresponding points on the pallet 310. FIG. 13 illustrates an example combination image file template 400 and how pixels in the combination image file template 400 map to points on a loaded pallet assembly 300. While every pixel in the image file 400 does actually map to a point on the pallet assembly 310/330, for ease of illustration only a few pixels A, B, C, D in image file 400 are shown mapped to points a, b c, d on the pallet assembly 310/330. Noticeably, some pixels A, B, C map to points on the pallet 310 on which a mouse pad 200 is loaded, while other pixels D map to points on the pallet assembly 310/330 (specifically carrier 330) which is not covered by a mouse pad.

Since some pixels in the combination image file template 400 will not map to a point on an actual article of manufacture but instead to a point on the frame section of the carrier 330, the positioning of each individual image 402a, 402b, 402c, 402d, 402e, 402f in its corresponding slot 401a, 401b, 401c, 401d, 401e, 401f of the combination image file template 400 must be implemented such that all or most of the pixels of the individual images 402a, 402b, 402c, 402d, 402e, 402f in the combination image file template 400 map to corresponding points of respective loaded articles of manufacture on the pallet assembly 310/330.

In the illustrative embodiment, each individual image 402a, 402b, 402c, 402d, 402e, 402f is intended to occupy the entire surface area of the respective mouse pad 200a, 200b, 200c, 200d, 200e, 200f on which is it printed. Thus, the individual images 402a, 402b, 402c, 402d, 402e, 402f are positioned within their respective slots 401a, 401b, 401c, 401d, 401e, 401f such that the pixels at the edges of the individual images 402a, 402b, 402c, 402d, 402e, 402f map to edge points on corresponding mouse pads 200a, 200b, 200c, 200d, 200e, 200f (or, if implemented to points on the pallet assembly that correspond to bleed edges, which are discussed hereinafter).

In an alternative embodiment, each individual image 402a, 402b, 402c, 402d, 402e, 402f is intended to be printed on only a designated portion of the surface area of the respective mouse pad 200a, 200b, 200c, 200d, 200e, 200f on which is it printed. Thus, pixels in the combination image file template 400 which correspond to edge pixels of the individual images may map to internal points on corresponding mouse pads.

In yet another alternative embodiment, each individual image 402a, 402b, 402c, 402d, 402e, 402f is intended to occupy the entire surface area of the respective article of manufacture (e.g., mouse pad 200a, 200b, 200c, 200d, 200e, 200f) on which is it printed and further extend a few pixels beyond the surface area of the respective mouse pads in order to ensure that if the alignment of the article of manufacture is off by a few pixels, the entire print surface area of the article of manufacture will still be covered by the image. Thus, in the illustrative embodiment, pixels in the combination image file template 400 which correspond to edge pixels of the individual images 402a, 402b, 402c, 402d, 402e, 402f map to points on the frame sections 334 of the carrier 330. Note that this type of printing results in overspray of ink onto the frame sections 334 of the carrier 330. However, since the carrier 330 is fabricated using an ink-resistant material, the carrier 330 can be cleaned between print operations. Alternatively, the carrier 330 may be fabricated using a material that allows the ink to adhere to the carrier 330 yet dry completely when the ink is dried in the drying unit 108 such that it does not result in undesirable ink dust that can be transferred to subsequently loaded mouse pads 200. Also to be noted is that the carrier 330 completely protects the pallet 310 from ink deposits.

When the respective individual images 402a, 402b, 402c, 402d, 402e, 402f are to be printed to cover at least a portion of the edges of the article of manufacture, the image to be printed may be sized to print an area slightly larger than the desired print area to accommodate any slight misalignment between the actual position of the print area printed by the printer and the actual physical position of the desired print area on the article of manufacture loaded on the pallet 310. The portion of the image that maps (at least theoretically) to points on the pallet or article of manufacture that lie outside the desired print area on the article of manufacture is referred to herein as the "bleed area". Adding a bleed area to the image to be printed ensures that the relevant edge(s) of the article of manufacture are fully covered by the image as expected. For example, when the article of manufacture is a mouse pad and the mouse pad is intended to be fully covered by an image, an image having dimensions slightly larger than the mouse pad (the excess dimensions generating the bleed area of the image) may be printed onto the mouse pad such that if the printer is misaligned with the pallet, or the mouse pad is slightly misaligned on the platform, or if there is any tolerance error in the printer setup or manufacture, the image still covers the entire mouse pad, resulting in a more aesthetically pleasing product. Were a bleed area not implemented in the image to be printed, any misalignment might cause a strip along one or more edges of the mouse pad to not get printed, which depending on the contrast between the base color of the mouse pad surface and the actual content of the image printed thereon, may in some instances be very noticeable and detract from the aesthetic quality of the mouse pad.

One disadvantage of implementing a bleed area in an image to be printed is that ink is applied outside the area of the mouse pad on portions of the carrier 330. While the carrier 330 is preferably implemented with an ink-resistant material in order to reduce transfer of ink from one use of the carrier 330 in a print operation to the next, nonetheless it would be desirable to be able to adjust the amount of bleed once the alignment characteristics of the printer 100 and pallet assembly 300 relative to one another are known. That is, once a pallet 310 has been attached to the print transport mechanism 102 (and therefore will not change from one print operation to the next (at least for one type of articles of manufacture, such as mouse pads 200)), and a couple or few print operations have completed, a print operator may determine that the printer 100 and pallet assembly 300 combination consistently result in printed images that are within a particular tolerance that is less than the default tolerance (defined by the bleed area). It would be desirable to allow the operator to change a parameter that adjusts the amount of bleed area. This would allow the operator to reduce the bleed area and therefore utilize less ink and reduce total production costs when it is determined that the printer and pallet assembly combination consistently requires a relatively narrower bleed. Conversely, when the bleed area is set to a narrower (relative to the default bleed width) or no width, such an adjustment tool would allow the operator to increase the bleed width to a wider width if either the operator or an automated monitoring system such as a statistical process control identifies a drift towards requiring more bleed.

Figure 14:
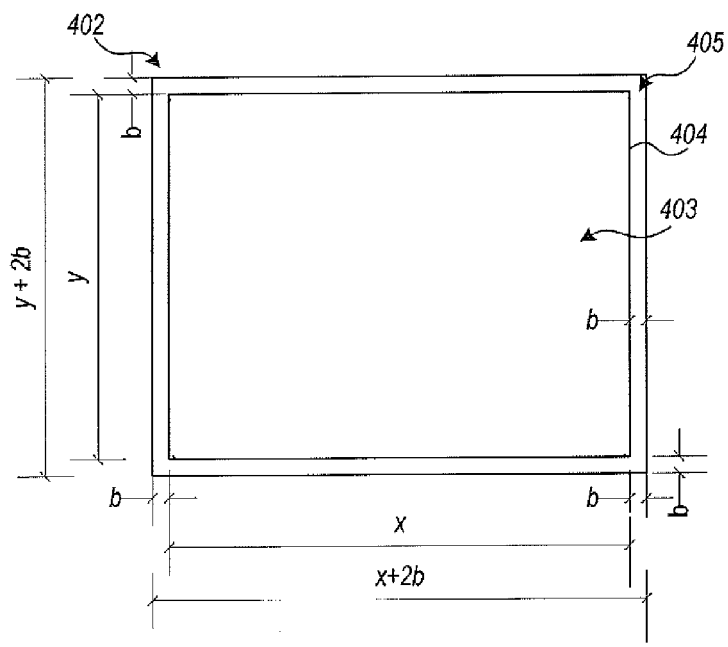
FIG. 14 is a diagram illustrating an individual image having a desired print area and a bleed area.

FIG. 14 illustrates an individual image 402 sized to print a bleed area 405 with width b around the perimeter 404 of the actual desired print area 403. As illustrated, the individual image 402 includes a portion of the image 403 having dimensions that match the desired print area that should be printed on the mouse pad 200. The individual image 402 also includes a bleed area 405 characterized by a contiguous strip of width b around the entire perimeter 404 of the desired print area 403. Thus, if the dimensions of the mouse pad 200 are x by y, the dimensions of the desired print area are also x by y, and the dimensions of the individual image 402 placed in the slot 401 are (x+2b) by (y+2b). For example, if the mouse pad dimensions are 235 mm by 195 mm, the dimensions of the individual image (desired print area plus bleed area) are 245 mm by 205 mm.

Figure 15:
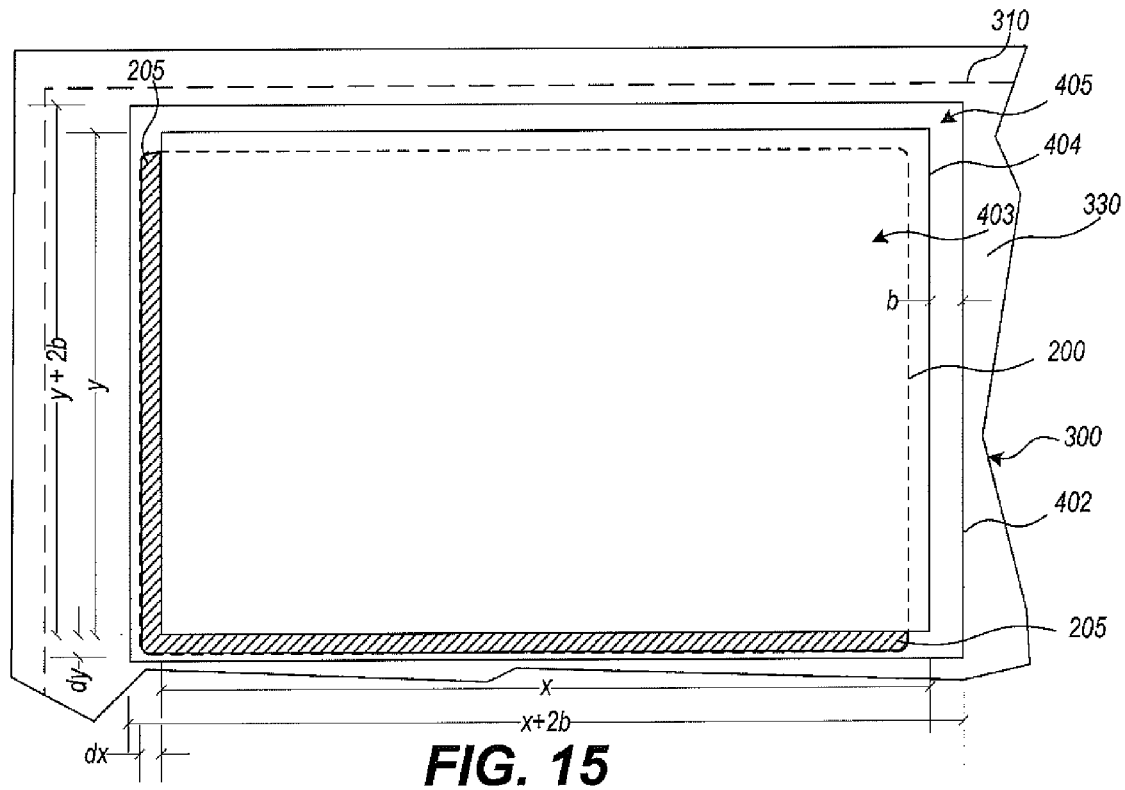
FIG. 15 is a diagram illustrating relative misalignment between a mouse pad loaded on a pallet assembly and an actual print area of an individual printed thereon.

FIG. 15 shows a portion of a loaded pallet assembly 310/330 and illustrates how the bleed area 405 of the individual image 402 ensures complete coverage of the mouse pad 200 when printed. (Note that the bleed area 405 is not to scale with the desired print area 203—it is shown enlarged in the illustration to assist in its description). As illustrated in FIG. 15, there is a relative misalignment between the physical position of the mouse pad 200 and the actual print area of the printed individual image 402. That is, there is a relative misalignment in the x dimension in the amount of dx, and there is a relative misalignment in the y dimension in the amount of dy. However, because the individual image 402 includes a bleed area 405 that is greater in width than the misalignment error, the printed image still entirely covers the mouse pad. If the individual image did not include the bleed area 405, portions 205 of the mouse pad 200 (indicated by cross-hatching in FIG. 15) would not have received image coverage, which would have reduced the aesthetic quality of the product.

Figure 16:
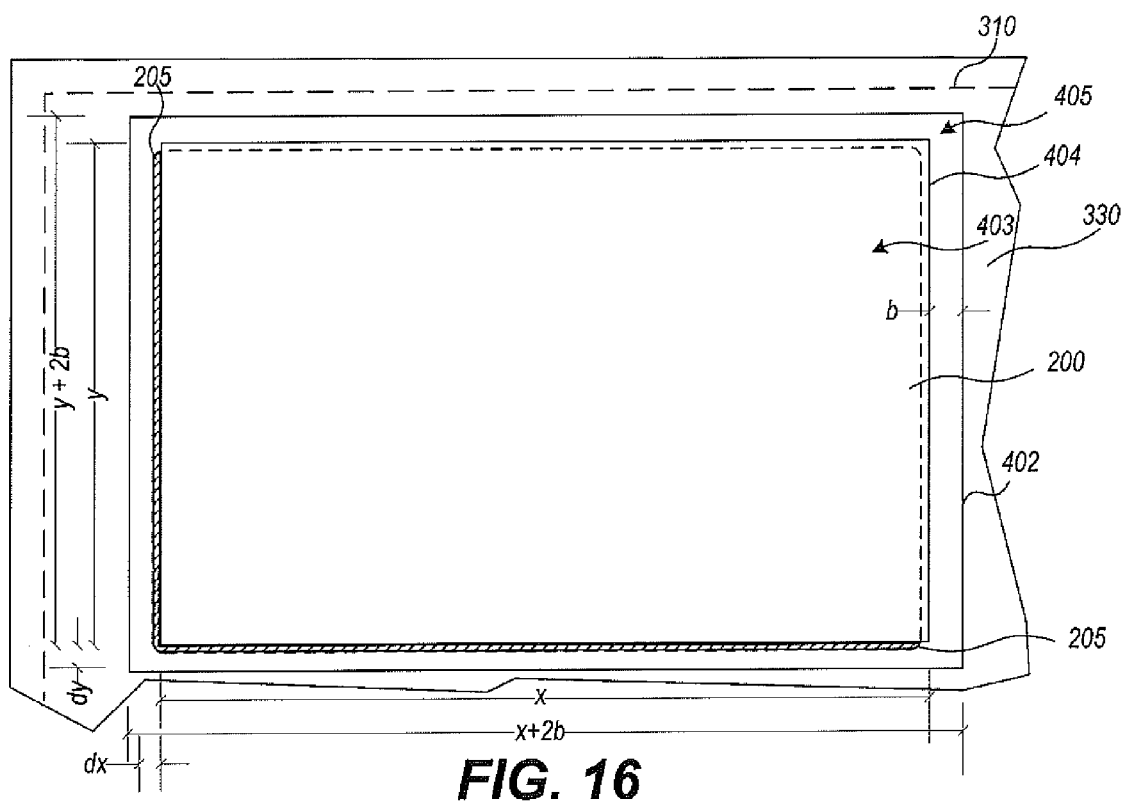
FIG. 16 is a diagram illustrating another example of relative misalignment between a mouse pad loaded on a pallet assembly and an actual print area of an individual printed thereon.

FIG. 16 illustrates another misalignment example wherein the relative misalignment between the physical position of the mouse pad 200 and the actual print area of the printed individual image 402 is very small. In this case, the bleed area 405 is large compared to the portions 205 of the mouse pad 200 (indicated by cross-hatching in FIG. 15) that would not have received image coverage, and therefore the width b of the bleed area could have been much smaller while still allowing the bleed area to achieve its purpose. If the relative misalignment error dx, dy were seen to be consistently lower than the bleed width b, then the bleed width b could be reduced to reduce the amount of ink utilized and applied to the carrier 330.

According to one aspect of the invention, an ink bleed adjustment tool is provided that allows adjustment of the width of the bleed during the generation of the combination image file 500 to be sent to the printer 100 and printed as a single file onto the loaded pallet assembly 300.

Figure 17:
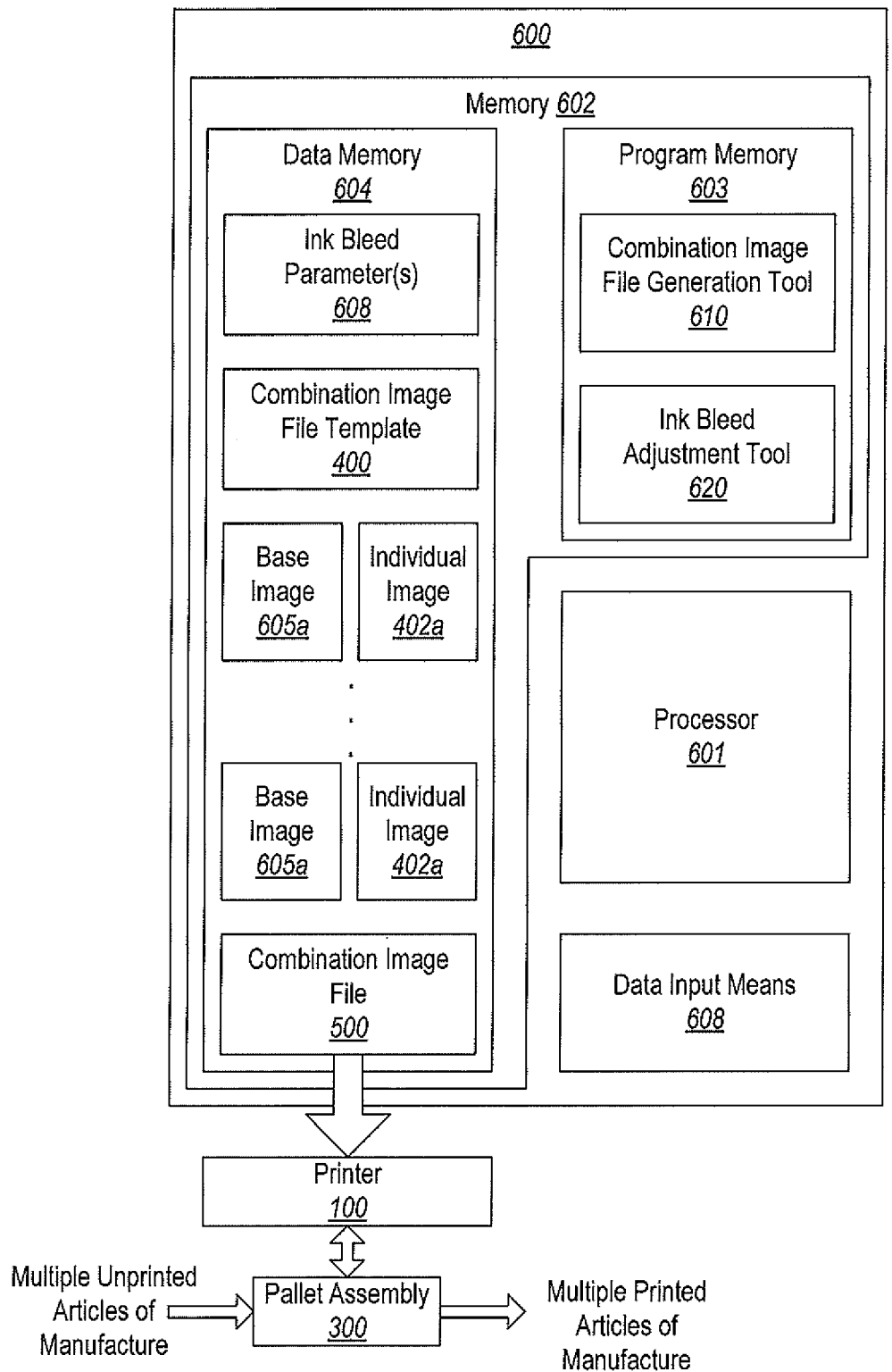
FIG. 17 is a system diagram of a combination image file generation system.

FIG. 17 is a block diagram of a combination image file generating system 600 which generates a combination image file for printing by a printer such as printer 100 which prints a single image file at a time. The combination image file generating system 600 includes a processor 601 and computer readable storage memory 602 that includes program memory 603 which stores computer readable program instructions that together implement a combination image file generation tool 610, and data memory 604 that retains a combination image file template 400 and a plurality of base images 605a, 605b, 605c, 605d, 605e, 605f. The program memory 603 also includes computer readable program instructions that together implement an ink bleed adjustment tool 620 that is utilized by the combination image file generation tool 610 to set the width b of the bleed area for base images 605a, 605b, 605c, 605d, 605e, 605f that are combined with the combination image file template 400 to generate a combination image file 500 to be printed by the printer 100 on a loaded pallet assembly 300 such that individual images 402a, 402b, 402c, 402d, 402e, 402f are printed on desired print areas of articles of manufacture 200a, 200b, 200c, 200d, 200e, 200f loaded on the pallet assembly 300.

The combination image file generating system 600 includes data input means 608, such as a computer keyboard, mouse, graphical user interface, communications interface, etc., which allows a print operator to input one or more ink bleed parameter values associated with the desired amount of bleed to be printed around the desired print areas. The ink bleed adjustment tool 620, under control of the processor 601, converts the received ink bleed parameter(s) to one or more ink bleed settings. The combination image file generation tool 610 and ink bleed adjustment tool 620 together sizes the base images 605a, 605b, 605c, 605d, 605e, 605f so that the pixels map to the size of a desired print area plus the desired amount of bleed when printed. The resized images are the individual images 402a, 402b, 402c, 402d, 402e, 402f that are then placed into the combination image file template 400 by the combination image file generation tool 610. Once all of the individual images 402a, 402b, 402c, 402d, 402e, 402f are place in the desired positions in the combination image file template 400 such that the individual images 402a, 402b, 402c, 402d, 402e, 402f will be printed onto the desired print areas of the articles of manufacture loaded on the pallet assembly 300, the file is converted (if necessary) and saved as a postscript file, namely the combination image file 500, that can then be sent to the printer 100 for printing as a single file, but resulting in simultaneous printing of each of the individual images 402a, 402b, 402c, 402d, 402e, 402f onto the desired print areas of the articles of manufacture loaded onto the pallet assembly 300. Once printed, the multiple articles of manufacture can be transported directly on the carrier 330 of the pallet assembly 300 by lifting the carrier 330 up off the pallet 310 and transporting the loaded carrier 330 to the drying unit 108.

In one embodiment, the printer 100 is a Kornit 931NDS, manufactured by Kornit Digital Ltd. having offices in the United States and Israel, and includes two independent printer transport mechanisms and two independent print head assemblies so that two independent print runs can be operated simultaneously. In an embodiment, the drying unit 108 is a Calmat Triple E oven, manufactured by Calmat, having headquarters in Holland, includes twin conveyor belts for simultaneously drying two lines of loaded carriers. In an embodiment, the temperature inside the drying unit is between 160° C. and 175° C. The maximum temperature and drying time may vary according to the type of article of manufacture. For example, in the case of a rubber substrate 201 in a mouse pad 200, the maximum temperature and drying time is restricted according to the melting properties of the rubber.

Figure 18:
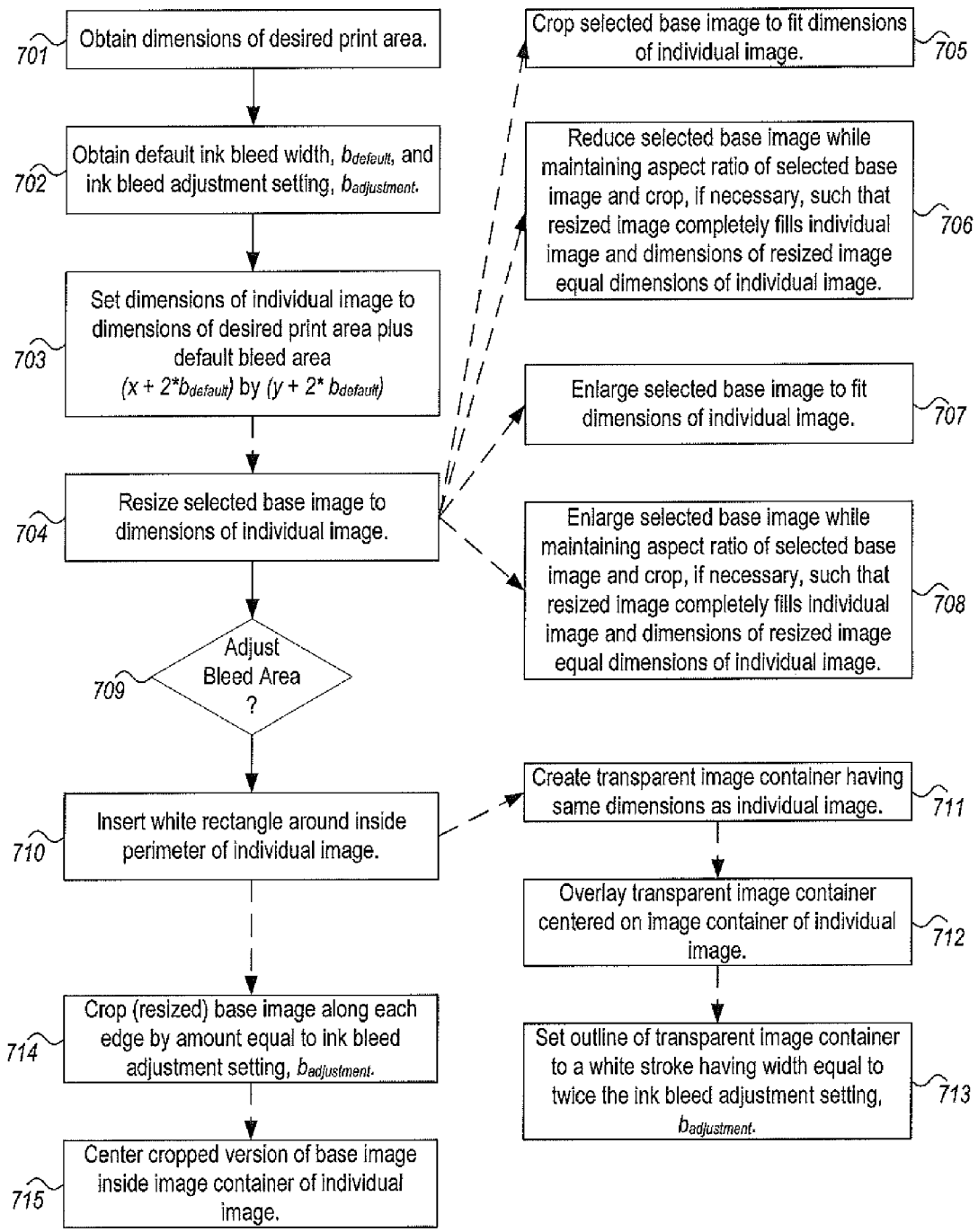
FIG. 18 is a flowchart of a method for creating individual images for placement in a combination image file template such that the individual images are sized to the desired print area plus a desired amount of bleed area.

FIG. 18 is a flowchart illustrating an exemplary method 700 for creating the individual images 402a, 402b, 402c, 402d, 402e, 402f prior to placement in the combination image file template 400 such that the individual images 402a, 402b, 402c, 402d, 402e, 402f are sized to the desired print area plus the desired amount of bleed area. The method assumes a default ink bleed width, $b_{default}$, for example 5 mm (but it is to be understood that the default ink bleed width could be any width so long as the resulting bleed will not be printed on any adjacent article of manufacture on the pallet. The default ink bleed width can be adjusted (reduced) by an amount equal to an ink bleed adjustment setting, $b_{adjustment}$. During initialization, the ink bleed adjustment setting, $b_{adjustment}$, may be set to zero such that the ink bleed width added to the desired display area in the individual image will be the default ink bleed width (e.g. $b=b_{default}-b_{adjustment}=5$ mm$-0=5$ mm).

Turning now to the steps of the method 700, the dimensions, x by y, of the desired print area of an individual image 402 (which may be any of 402a, 402b, 402c, 402d, 402e, 402f) to be inserted into the template 400 is obtained (step 701). The default ink bleed width, $b_{default}$, and ink bleed adjustment setting, $b_{adjustment}$, are also obtained (step 702). The ink bleed adjustment setting, $b_{adjustment}$, can be obtained in one of several ways. In one embodiment, the user can enter a desired bleed width $b_{desired}$, and the processor can calculate the adjustment setting $b_{adjustment}$ as $b_{adjustment}=b_{default}-b_{desired}$. In another embodiment, the user can enter the adjustment $b_{adjustment}$ directly.

The dimensions of the individual image 402 are then set to the dimensions of the desired print area plus the default bleed area, e.g. $(x+2*b_{default})$ by $(y+2*b_{default})$ (step 703). If the dimensions of the selected base image 605 (i.e., one of base images 605a, 605b, 605c, 605d, 605e, 605f) is not already equal to the dimensions of the individual image 402, the selected base image 605 is sized to the dimensions of the individual image 402 (step 704). For example, if the base image 605 has dimensions that are larger than the dimensions of the individual image 402, the base image 605 may be cropped to fit the dimensions of the individual image 402 and then saved as the corresponding individual image 402 that is to be inserted into the combination image file template 400 (step 705). Alternatively, the base image 605 could be reduced in size, while still retaining its aspect ratio, and then cropped if necessary such that the dimensions of the resized image equals the dimensions of the individual image 402, while still fully filling the area of the individual image 402 with image content (step 706). If the base image 605 has dimensions that are smaller than the dimensions of the individual image 402, the base image 605 may be enlarged to fit the dimensions of the individual image 402 and then saved as the corresponding individual image 402 that is to be inserted into the combination image file template 400 (step 707). In an embodiment, the base image 605 could be enlarged while still retaining the original aspect ratio of the base image 605, and then cropped if necessary such that the dimensions of the enlarged image equals the dimensions of the individual image 402, while still fully filling the area of the individual image 402 with image content (step 708).

Once the base image 605 is sized to fit the dimensions of the individual image 402, a determination is made (in step 709) as to whether an adjustment is required to the bleed area (i.e., whether $b_{adjustment}$ is non-zero). If an adjustment (i.e., reduction) to the bleed area is required (i.e., $b_{adjustment}$ is non-zero), then a white frame having a width equal to the difference between the default bleed width, $b_{default}$, and the desired bleed width, $b_{desired}$, (i.e., the value of $b_{adjustment}$) is inserted around inside perimeter of the individual image (step 710).

Figure 19:
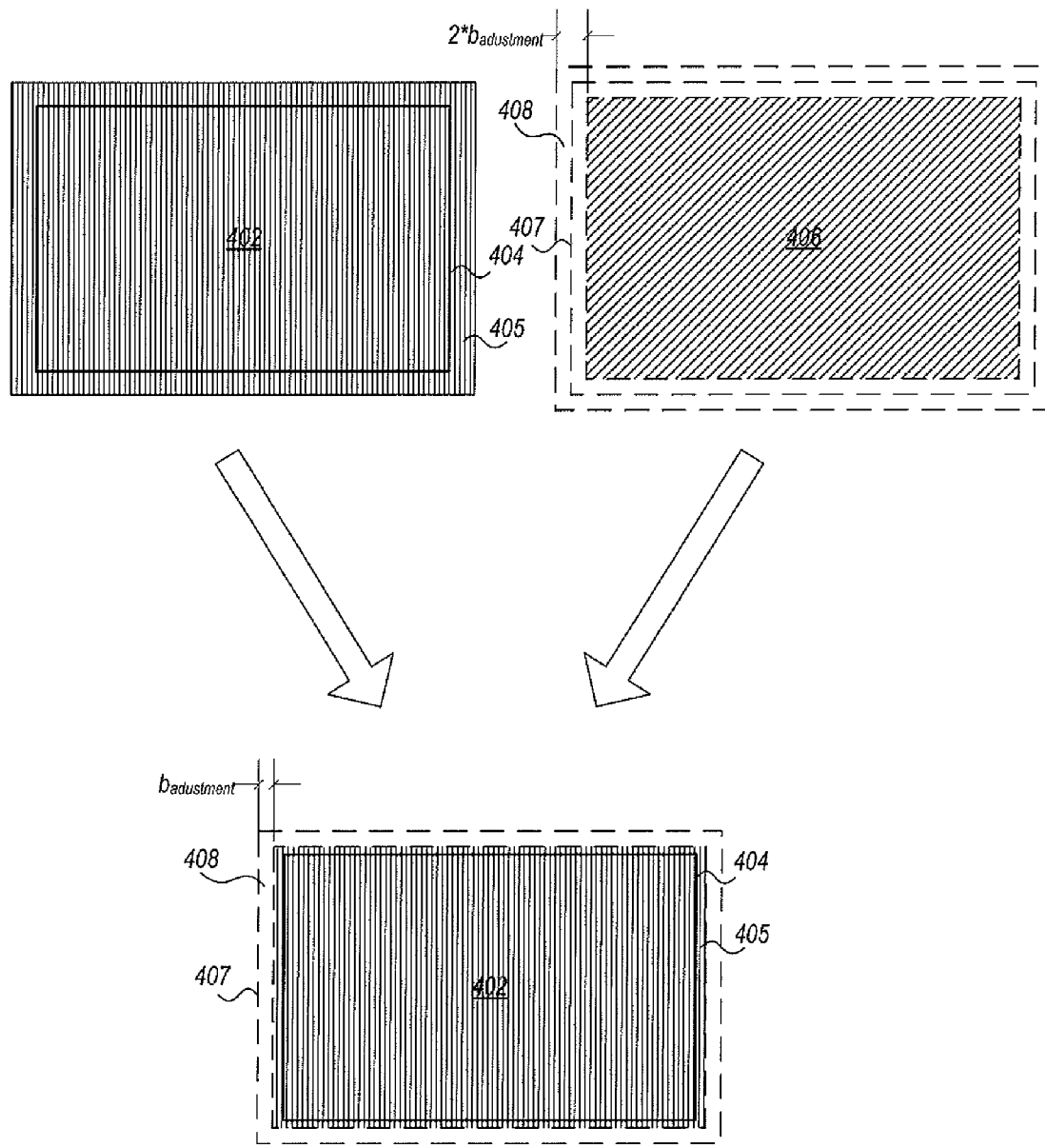
FIG. 19 is a diagram illustrating creation of an individual with desired amount of bleed area by addition of a white stroke around the perimeter of a transparent overlay.

In an embodiment, as illustrated in FIG. 19, this may be accomplished by creating (step 711), overlaying and centering a transparent image container 406 of the same size as the individual image over the image container of the individual image (step 712), and specifying the boundary perimeter 406 of the transparent container as a white stroke 408 having a stroke width double the size of $b_{adjustment}$ (step 713). Since only the portion of the content inside the transparent image container 406 implementing the individual image is printed, the portion of the stroke 408 lying outside the perimeter 407 is not printed. The portion of the stroke 408 lying on and inside the perimeter 407 of the combined individual image whites out any image content lying thereunder, essentially operating like a matte in a framed picture. Because the stroke 408 whites out portions of the bleed area, ink will not be applied to the pallet assembly 300 in areas of these whited-out portions of the bleed area. Thus, the amount of ink used is reduced, reducing the overall cost of printing. Of course, the ink bleed adjustment should only be utilized when it is determined that the printing characteristics of the particular printer and pallet assembly combination require less bleed than the default bleed, but it allows the printer operator to control the width of the bleed over multiple print runs using the same pallet assembly 300. Alternatively, the bleed characteristics of the printer and pallet assembly combination 300 can be automatically monitored, for example by taking optical measurements of the actual relative misalignment and automatically adjusting the ink bleed adjustment setting, $b_{adjustment}$, to efficiently match the actual relative misalignment.

In an alternative embodiment of step 710, once the base image 605 is sized to the dimensions of the individual image (having dimensions equal to the desired print area plus default bleed area), the sized based image 605 can be cropped along each edge by an amount equal to the ink bleed adjustment setting, $b_{adjustment}$ (step 714), and then the cropped version can then be centered inside the image container defining the individual image 402 (step 715).

The individual image 402 is saved and associated with the base image 605. The method 700 is repeated for each base image 605 to be converted to an individual image 402 and inserted into a combination image file template 400 to be converted to a print-ready combination image file 500 and sent to the printer 100 for printing onto a pallet loaded with multiple articles of manufacture.

Figure 20:
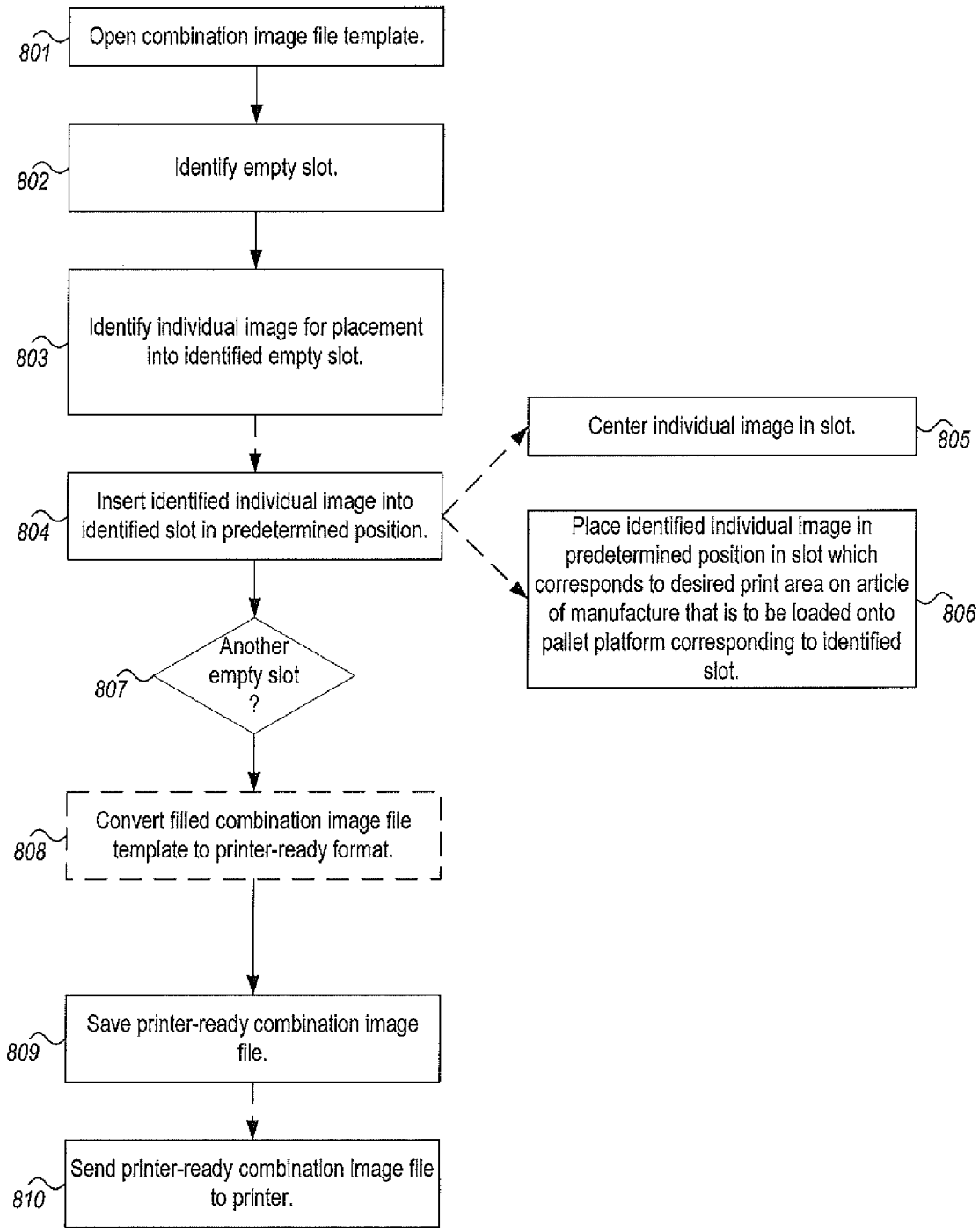
FIG. 20 is a flowchart illustrating a method for creating a combination image file given a set of individual images sized to a desired print area plus a desired amount of bleed area.

FIG. 20 is a flowchart illustrating an exemplary method for creating the combination image file 500 given a set of individual images 402a, 402b, 402c, 402d, 402e, 402f sized to the desired print area plus the desired amount of bleed area. As illustrated in FIG. 20, first, a combination image file template 400 is opened (step 801). The combination image file template 400 includes a number of slots 401a, 401b, 401c, 401d, 401e, 401f, each corresponding to an area of the pallet assembly 330 on which a single article of manufacture is loaded. If one exists, an empty slot 401 is identified (step 802). An individual image 402a, 402b, 402c, 402d, 402e, 402f is identified for placement into an empty slot (step 803). The identified individual image 402 is inserted in a predetermined position into the identified slot 401 (step 804). In an embodiment, the identified individual image 402 is centered in the identified slot 401 (step 805).

In alternative embodiments, the identified individual image 402 is placed in a predetermined position (in the slot 401) that corresponds to a desired print area on an article of manufacture that is to be loaded in a predetermined position on the pallet that corresponds to the particular slot 401 (step 806). For example, if the individual image 402 is to printed only in the upper left hand corner of a rectangular article of manufacture, the individual image would be placed in an area of the slot whose pixels map to the upper left hand corner of the article of manufacture when the article of manufacture is loaded on the platform of the pallet that corresponds to the slot. Steps 802 through 804 are repeated until there are no more empty slots 401 identified in step 802 (identified in step 807). Once the combination image file template 400 is filled with individual images 402, the filled combination image file template 400 is converted, if necessary, to a postscript or other such print-ready file 500 (step 808), and saved as a combination image file 500 that is ready to be sent to the printer 100 for printing (step 809), and sent to the printer 100 for printing (step 810).

In an embodiment, the combination image file template 400 is implemented in a .pdf format (from Adobe Systems), which is already a print-ready format, with each slot comprising an image container. Thus, individual images can be inserted into the image containers in the template file, and the template file can then simply be saved in the pdf format.

In an embodiment, each slot in the combination image file template 400 comprises an independent image container having dimensions the size of the slot 401, and an individual image 402 can be inserted into the image container corresponding to a slot 401.

Figure 21:
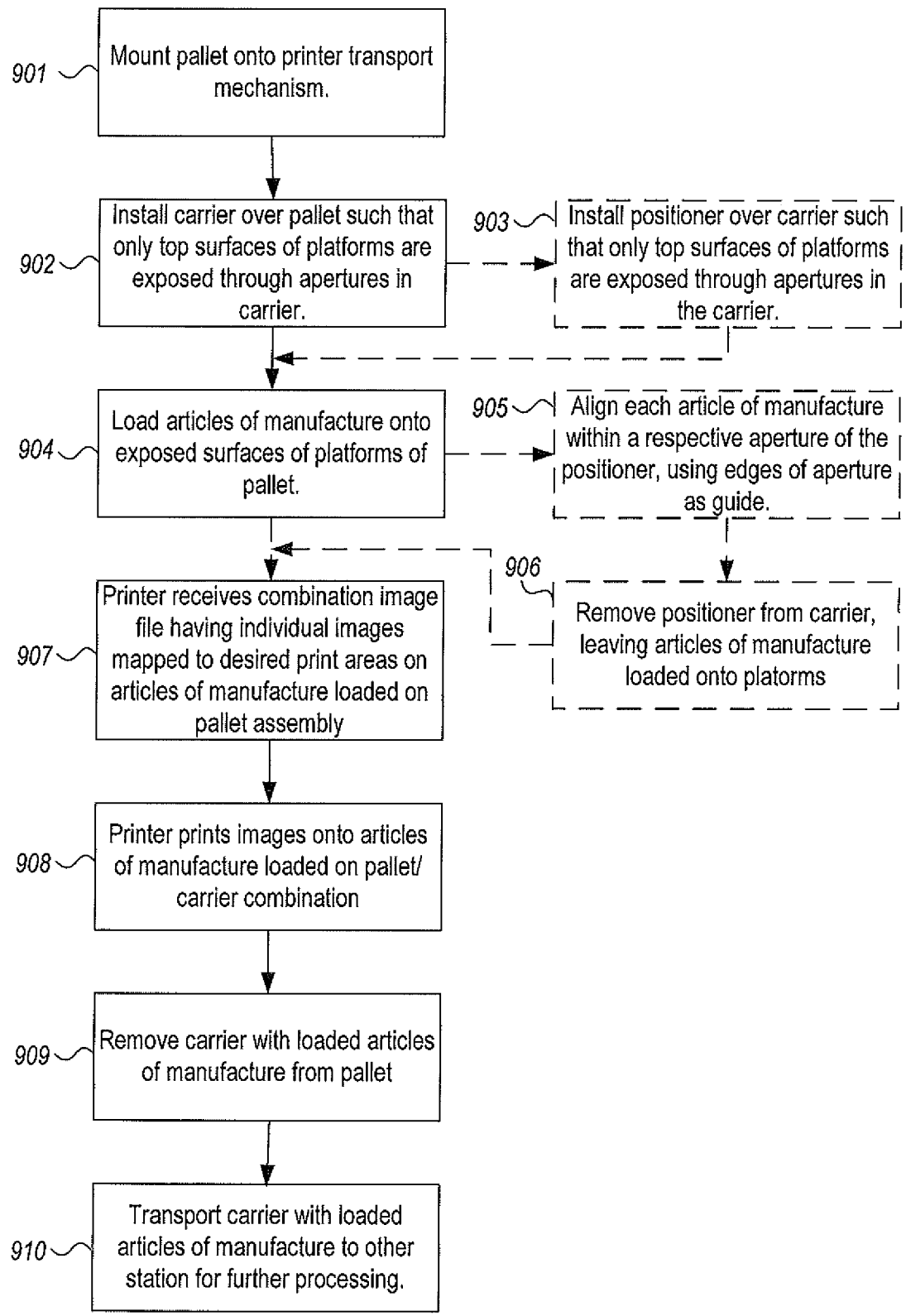
FIG. 21 is a flowchart illustrating a method of simultaneously printing multiple articles of manufacture.

FIG. 21 illustrates an exemplary method for simultaneously printing one or more images onto multiple articles of manufacture, for example using the printer 100 of FIGS. 1A, 1B, or 1C in conjunction with the carrier assembly 300 of FIGS. 3A-3B. In this method, a pallet 310 implemented according to the principles of the invention, for example a pallet 310 implemented as in FIGS. 3A-3B, is mounted on a printer transport mechanism (step 901). A carrier 330 configured to fit over the pallet 310 such that only the surfaces 315 of the platforms 314 are exposed through apertures 331 formed therein is positioned in alignment over the pallet 310 (step 902). Optionally, a positioner 350 configured to fit over the carrier 330 and pallet 310 combination such that only the surfaces 315 of the pallet platforms 314 are exposed through apertures 352 formed in the positioner 350 is positioned in alignment over the carrier 330 (step 903). Articles of manufacture 200 are then loaded onto the platforms 314 of the pallet 310 in alignment with the platforms 314 (step 904). When the positioner 350 is utilized, each article of manufacture 200 is fitted in alignment within a respective aperture 352 of the positioner 352 (step 905). The positioner 350 is then removed (step 906), leaving the articles of manufacture 200 loaded on each of the pallet platforms 314. The carrier 330 remains in place.

The printer 100 receives a combination image file 500 containing individual images to be simultaneously printed onto respective mouse pads 200 loaded onto the pallet assembly 300 (step 907). In an embodiment, each of the images printed onto each of the articles of manufacture 200 is combined into a single image file such that placement of the respective image in the image file corresponds to the placement of the corresponding article of manufacture on the pallet. Thus, given the combined image file, the printer prints all of the individual images onto the corresponding articles of manufacture through the printing of a single combination image file. In other words, the printer itself has no knowledge that it is printing onto multiple articles of manufacture versus printing onto one large print substrate.

The printer 100 prints the individual images contained in the combination image file 500 onto the multiple articles of manufacture 200 loaded on the pallet 310 (step 908). Upon completion of the print operation, the carrier 330 with printed mouse pads 200 loaded thereon can be removed from the pallet 310 by lifting the carrier 330 vertically such that the carrier apertures 331 clear the alignment pins 326 and platforms 314 (step 909). The loaded carrier 330 can then be transported to a drying unit 108 or other station for further processing (step 910).

The pallet assembly 300 and techniques for generating a combination image file that can be used in conjunction with the pallet assembly 300, as described herein, have several advantages. First, multiple articles of manufacture may be simultaneously printed, resulting in savings of time and operator attention for loading and unloading articles of manufacture into the printer for printing. Second, any ink that strays from the articles of manufacture is applied to the carrier and not to the pallet. The carrier is made from an ink resistant material so that it may be easily cleaned, thereby preventing residual ink or ink dust from collecting on newly loaded articles of manufacture. Third, the carrier is removable, thereby allowing all of the loaded articles of manufacture to be simultaneously transported and reused in a drying unit 108. Also, the positioner is removable so that it can be used to quickly place and align the articles of manufacture on the pallet and then removed to prevent any ink from transferring to the positioner, and thereby subsequently preventing transfer of ink or ink dust from printed article of manufacture to next loaded article of manufacture via the positioner. Additionally, if an ink bleed area is added to the images to be printed, the bleed area can be adjusted to minimize the amount of bleed when the relative misalignment between the printer and pallet assembly is small.

While an exemplary embodiment of the invention has been discussed, the described embodiment is to be considered as illustrative rather than restrictive. The scope of the invention is as indicated in the following claims and all equivalent methods and systems.

What is claimed is:

1. A method for creating an individual image sized to a desired print area plus a desired amount of bleed area, the individual image for insertion in a predetermined position in an identified slot of a combination image file template, the combination image file template comprising a plurality of individual slots each corresponding to an area of a pallet assembly to be loaded onto a printer, and each area of the pallet assembly configured to be loaded with a single article of manufacture, the method comprising:

obtaining dimensions of the desired print area on the article of manufacture to be loaded on the area of the pallet assembly corresponding to the identified slot;

obtaining a default ink bleed width;

obtaining an ink bleed adjustment setting;

setting each of the respective dimensions of the individual image to the corresponding respective dimension of the desired print area plus the default ink bleed width;

sizing the base image to the dimensions of the individual image to generate a resized base image if dimensions of a base image to be incorporated in the individual image do not equal the dimensions of the individual image;

determining whether an adjustment is required to a bleed area defined by the default ink bleed width;

if an adjustment to the bleed area is required, obtaining an adjustment setting indicative of a desired width of the ink bleed and inserting a white frame around the inside perimeter of the individual image to generate an adjusted bleed image, the white frame having a width equal to the difference between the default ink bleed width and the desired width of the ink bleed; and inserting the adjusted bleed image in a predetermined position in the identified slot of the template if an adjustment to the bleed area was required, and otherwise inserting the resized base image in the predetermined position in the identified slot of the template if the base image was resized;

opening a combination image file template, the template having a plurality of slots, each of which corresponds to an area of a pallet assembly to be loaded onto a printer, and each area of the pallet assembly configured to be loaded with a single article of manufacture; identifying an unfilled slot; identifying an individual image for placement into the unfilled slot; filling the unfilled slot such that the unfilled slot becomes a filled slot by inserting the identified individual image in a predetermined position in the identified slot of the template.

2. The method of claim 1, wherein the step of inserting a white frame around the inside perimeter of the individual image comprises:

creating a transparent image container of same size as an image container defining the individual image;

centering the transparent image container over the image container defining the individual image; and specifying a boundary perimeter of the transparent container as a white stroke having a stroke width double the size of desired width of the ink bleed.

3. The method of claim 1, wherein the step of inserting a white frame around the inside perimeter of the individual image comprises:

after sizing the base image to the dimensions of the individual image, cropping the sized based image along each edge by an amount equal to the desired width of the ink bleed; and centering the cropped version of the sized base image inside an image container defining the individual image.

4. The method of claim 1, further comprising:

repeating each of the steps of claim 1 for a plurality of additional base images.

5. The method of claim 4, comprising:

inserting each of the individual images into a different slot in a combination image file template to fill all of the slots in the combination image file template; and generating a print-ready version of the filled combination image file template to create a combination image file ready for printing by a printer.

6. The method of claim 5, further comprising:

sending the combination image file to the printer to simultaneously print a plurality of articles of manufacture.

7. An article of manufacture printed according to the method of claim 6.

8. The method of claim 1, wherein the sizing step comprises:

cropping the base image to fit the dimensions of the individual image if the dimensions of the base image are larger than the dimensions of the individual image; and saving the cropped image as the corresponding individual image.

9. The method of claim 1, wherein the sizing step comprises:

reducing the base image in size while retaining an original aspect ratio of the base image such that at least one of the dimensions of the reduced base image matches a corresponding dimension of the individual image while still completely filling an image container having the dimensions of the individual image; and cropping the reduced base image, if necessary, such that both dimensions of the reduced base image match the dimensions of the individual image.

10. The method of claim 1, wherein the sizing step comprises:

enlarging the base image to fit the dimensions of the individual image if the base image has dimensions that are smaller than the dimensions of the individual image; and saving the enlarged image as the individual image.

11. The method of claim 10, wherein the enlarging step comprises:

enlarging the base image while still retaining the original aspect ratio of the base image; and cropping the enlarged based image, if necessary, such that the dimensions of the enlarged image equals the dimensions of the individual image while the content of the cropped enlarged base image fully fills an image container having the dimensions of the individual image.

12. One or more computer readable storage mediums together tangibly embodying program instructions which, when executed by a computer, implement a method for creating an individual image sized to a desired print area plus a desired amount of bleed area, the individual image for insertion in a predetermined position in an identified slot of a combination image file template, the combination image file template comprising a plurality of individual slots each corresponding to an area of a pallet assembly to be loaded onto a printer, and each area of the pallet assembly configured to be loaded with a single article of manufacture, the method comprising:

obtaining dimensions of the desired print area on the article of manufacture to be loaded on the area of the pallet assembly corresponding to the identified slot;

obtaining a default ink bleed width;

obtaining an ink bleed adjustment setting;

setting each of the respective dimensions of the individual image to the corresponding respective dimension of the desired print area plus the default ink bleed width;

sizing the base image to the dimensions of the individual image to generate a resized base image if dimensions of a base image to be incorporated in the individual image do not equal the dimensions of the individual image;

determining whether an adjustment is required to a bleed area defined by the default ink bleed width;

if an adjustment to the bleed area is required, obtaining an adjustment setting indicative of a desired width of the ink bleed and inserting a white frame around the inside perimeter of the individual image to generate an adjusted bleed image, the white frame having a width equal to the difference between the default ink bleed width and the desired width of the ink bleed; and inserting the adjusted bleed image in a predetermined position in the identified slot of the template if an adjustment to the bleed area was required, and otherwise inserting the resized base image in the predetermined position in the identified slot of the template if the base image was resized.

13. The one or more computer readable storage mediums of claim 12, wherein the method step of inserting a white frame around the inside perimeter of the individual image comprises:

creating a transparent image container of same size as an image container defining the individual image;

centering the transparent image container over the image container defining the individual image; and specifying a boundary perimeter of the transparent container as a white stroke having a stroke width double the size of desired width of the ink bleed.

14. The one or more non-transitory computer readable storage mediums of claim 12, wherein the method step of inserting a white frame around the inside perimeter of the individual image comprises:

after sizing the base image to the dimensions of the individual image, cropping the sized based image along each edge by an amount equal to the desired width of the ink bleed; and centering the cropped version of the sized base image inside an image container defining the individual image.

15. The one or more non-transitory computer readable storage mediums of claim 12, wherein the method further comprises:

repeating each of the steps of claim 1 for a plurality of additional base images.

16. The one or more non-transitory computer readable storage mediums of claim 15, the method further comprising:

inserting each of the individual images into a different slot in a combination image file template to fill all of the slots in the combination image file template; and generating a print-ready version of the filled combination image file template to create a combination image file ready for printing by a printer.

17. The one or more non-transitory computer readable storage mediums of claim 16, the method further comprising:

sending the combination image file to a printer to simultaneously print a plurality of articles of manufacture.

18. The one or more non-transitory computer readable storage mediums of claim 12, wherein the sizing step comprises:

cropping the base image to fit the dimensions of the individual image if the dimensions of the base image are larger than the dimensions of the individual image; and saving the cropped image as the corresponding individual image.

19. The one or more non-transitory computer readable storage mediums of claim 13, wherein the sizing step comprises:

reducing the base image in size while retaining an original aspect ratio of the base image such that at least one of the dimensions of the reduced base image matches a corresponding dimension of the individual image while still completely filling an image container having the dimensions of the individual image; and cropping the reduced base image, if necessary, such that both dimensions of the reduced base image match the dimensions of the individual image.

20. The one or more non-transitory computer readable storage mediums of claim 1, wherein the sizing step comprises:

enlarging the base image to fit the dimensions of the individual image if the base image has dimensions that are smaller than the dimensions of the individual image; and saving the enlarged image as the individual image.

21. The one or more non-transitory computer readable storage mediums of claim 20, wherein the enlarging step comprises:

enlarging the base image while still retaining the original aspect ratio of the base image; and cropping the enlarged based image, if necessary, such that the dimensions of the enlarged image equals the dimensions of the individual image while the content of the cropped enlarged base image fully fills an image container having the dimensions of the individual image.

22. A system for creating an individual image sized to a desired print area plus a desired amount of bleed area, comprising:

one or more processors;

computer readable storage memory which stores dimensions of the desired print area, a default ink bleed width, and at least one of a desired ink bleed width and an ink bleed adjustment setting, the computer readable storage memory further comprising program instructions which implement, when executed by the one or more processors, the steps of claim 1.

* * * * *